US007865427B2

(12) United States Patent
Wright et al.

(10) Patent No.: US 7,865,427 B2
(45) Date of Patent: Jan. 4, 2011

(54) METHOD AND APPARATUS FOR EVALUATING FRAUD RISK IN AN ELECTRONIC COMMERCE TRANSACTION

(75) Inventors: William Wright, Los Gatos, CA (US); Hung-Tzaw Hu, Saratoga, CA (US)

(73) Assignee: Cybersource Corporation, Mountain View, CA (US)

( * ) Notice: Subject to any disclaimer, the term of this patent is extended or adjusted under 35 U.S.C. 154(b) by 1496 days.

(21) Appl. No.: 10/142,271

(22) Filed: May 8, 2002

(65) Prior Publication Data

US 2002/0194119 A1  Dec. 19, 2002

Related U.S. Application Data

(60) Provisional application No. 60/294,852, filed on May 30, 2001.

(51) Int. Cl.
*G06Q 40/00* (2006.01)
(52) U.S. Cl. .............................. 705/38; 705/4; 705/35; 705/39
(58) Field of Classification Search .................. 705/38, 705/35, 39
See application file for complete search history.

(56) References Cited

U.S. PATENT DOCUMENTS

| 3,657,702 A | 4/1972 | Stephenson, Jr. |
| 3,950,733 A | 4/1976 | Cooper et al. |

(Continued)

FOREIGN PATENT DOCUMENTS

| EP | 0 598 469 | 5/1994 |

(Continued)

OTHER PUBLICATIONS

Michael J. A. Berry and Gordon Linoff, Data Mining Techniques, Jul. 2, 1997, John Wiley & Sons, Inc., p. 297-300.*

(Continued)

*Primary Examiner*—James A Kramer
*Assistant Examiner*—Martin A Gottschalk
(74) *Attorney, Agent, or Firm*—Hickman Palermo Truong & Becker LLP

(57) ABSTRACT

According to one aspect, transaction information is received and applied to multiple fraud risk mathematical models that each produce a respective raw score, which are transformed with respective sigmoidal transform functions to produce optimized likelihood of fraud risk estimates to provide to a merchant. In one embodiment, the respective fraud risk estimates are combined using fusion proportions that are associated with the respective risk estimates, producing a single point risk estimate, which is transformed with a sigmoidal function to produce an optimized single point risk estimate for the transaction. The sigmoidal functions are derived to approximate a relationship between risk estimates produced by fraud risk detection models and a percentage of transactions associated with respective risk estimates, where the relationship is represented in terms of real-world distributions of fraudulent transaction and non-fraudulent transaction. One embodiment is directed to computing respective risk test penalties for multiple risk tests in one or more of the multiple fraud risk mathematical models used to estimate the likelihood of fraud, given a certain pattern of events represented by the transaction information, wherein the respective risk test penalties are computed as the inverse of the sum of one and a false positive ratio for the respective risk test.

18 Claims, 15 Drawing Sheets

U.S. PATENT DOCUMENTS

| | | | |
|---|---|---|---|
| 4,044,243 A | 8/1977 | Cooper et al. | |
| 4,254,474 A | 3/1981 | Cooper et al. | |
| RE30,579 E | 4/1981 | Goldman et al. | |
| RE30,580 E | 4/1981 | Goldman et al. | |
| 4,305,059 A | 12/1981 | Benton | |
| 4,326,259 A | 4/1982 | Cooper et al. | |
| 4,485,300 A | 11/1984 | Peirce | |
| 4,510,382 A | 4/1985 | Walter | |
| 4,528,643 A | 7/1985 | Freeny, Jr. | |
| 4,578,530 A | 3/1986 | Zeidler | |
| 4,594,663 A | 6/1986 | Nagata et al. | |
| 4,734,564 A | 3/1988 | Boston et al. | |
| 4,734,858 A | 3/1988 | Schlafly | |
| 4,755,935 A | 7/1988 | Davis et al. | |
| 4,755,940 A | 7/1988 | Brachtl et al. | |
| 4,760,604 A | 7/1988 | Cooper et al. | |
| 4,792,968 A | 12/1988 | Katz | |
| 4,795,890 A | 1/1989 | Goldman | |
| 4,799,156 A | 1/1989 | Shavit et al. | |
| 4,812,628 A | 3/1989 | Boston et al. | |
| 4,827,508 A | 5/1989 | Shear | |
| 4,845,739 A | 7/1989 | Katz | |
| 4,893,330 A | 1/1990 | Franco | |
| 4,897,811 A | 1/1990 | Scofield | |
| 4,922,521 A | 5/1990 | Krikke et al. | |
| 4,935,870 A | 6/1990 | Burk, Jr. et al. | |
| 4,947,028 A | 8/1990 | Gorog | |
| 4,949,257 A | 8/1990 | Orbach | |
| 4,958,375 A | 9/1990 | Reilly | |
| 4,977,595 A | 12/1990 | Ohta et al. | |
| 4,982,346 A | 1/1991 | Girouard et al. | |
| 4,992,940 A | 2/1991 | Dworkin | |
| 5,025,373 A | 6/1991 | Keyser, Jr. et al. | |
| 5,060,153 A | 10/1991 | Nakagawa | |
| 5,077,607 A | 12/1991 | Johnson et al. | |
| 5,175,682 A | 12/1992 | Higashiyama et al. | |
| 5,177,342 A | 1/1993 | Adams | |
| 5,206,488 A | 4/1993 | Teicher | |
| 5,220,501 A | 6/1993 | Lawlor et al. | |
| 5,231,570 A | 7/1993 | Lee | |
| 5,247,575 A | 9/1993 | Sprague et al. | |
| 5,253,341 A | 10/1993 | Rozmanith et al. | |
| 5,255,342 A * | 10/1993 | Nitta | 704/200 |
| 5,291,550 A | 3/1994 | Levy et al. | |
| 5,305,195 A | 4/1994 | Murphy | |
| 5,311,594 A | 5/1994 | Penzias | |
| 5,321,751 A | 6/1994 | Ray et al. | |
| 5,335,265 A | 8/1994 | Cooper et al. | |
| 5,336,870 A | 8/1994 | Hughes et al. | |
| 5,341,429 A | 8/1994 | Stringer et al. | |
| 5,347,632 A | 9/1994 | Filepp et al. | |
| 5,351,186 A | 9/1994 | Bullock et al. | |
| 5,351,293 A | 9/1994 | Michener et al. | |
| 5,351,296 A | 9/1994 | Sullivan | |
| 5,377,269 A | 12/1994 | Heptig et al. | |
| 5,383,113 A | 1/1995 | Kight et al. | |
| 5,386,104 A | 1/1995 | Sime | |
| 5,398,300 A | 3/1995 | Levey | |
| 5,414,833 A | 5/1995 | Hershey et al. | |
| 5,420,405 A | 5/1995 | Chasek | |
| 5,471,627 A | 11/1995 | Means et al. | |
| 5,475,585 A | 12/1995 | Bush | |
| 5,479,574 A | 12/1995 | Glier et al. | |
| 5,491,817 A | 2/1996 | Gopal et al. | |
| 5,500,513 A | 3/1996 | Langhans et al. | |
| 5,511,122 A | 4/1996 | Atkinson | |
| 5,515,307 A | 5/1996 | Aiello et al. | |
| 5,530,438 A | 6/1996 | Bickham et al. | |
| 5,542,054 A * | 7/1996 | Batten, Jr. | 706/26 |
| 5,557,518 A | 9/1996 | Rosen | |
| 5,559,895 A * | 9/1996 | Lee et al. | 382/119 |
| 5,590,197 A | 12/1996 | Chen et al. | |
| 5,596,642 A | 1/1997 | Davis et al. | |
| 5,596,643 A | 1/1997 | Davis et al. | |
| 5,604,802 A | 2/1997 | Holloway | |
| 5,608,801 A | 3/1997 | Aiello et al. | |
| 5,621,797 A | 4/1997 | Rosen | |
| 5,623,547 A | 4/1997 | Jones et al. | |
| 5,627,972 A | 5/1997 | Shear | |
| 5,629,982 A | 5/1997 | Micali | |
| 5,642,419 A | 6/1997 | Rosen | |
| 5,671,280 A | 9/1997 | Rosen | |
| 5,675,713 A * | 10/1997 | Batten, Jr. | 706/26 |
| 5,680,511 A | 10/1997 | Baker et al. | |
| 5,696,907 A * | 12/1997 | Tom | 705/38 |
| 5,696,909 A | 12/1997 | Wallner | |
| 5,701,398 A | 12/1997 | Glier et al. | |
| 5,703,949 A | 12/1997 | Rosen | |
| 5,704,018 A * | 12/1997 | Heckerman et al. | 706/12 |
| 5,708,422 A | 1/1998 | Blonder et al. | |
| 5,710,887 A | 1/1998 | Chelliah et al. | |
| 5,715,314 A | 2/1998 | Payne et al. | |
| 5,724,424 A | 3/1998 | Gifford | |
| 5,729,594 A | 3/1998 | Klingman | |
| 5,732,400 A | 3/1998 | Mandler | |
| 5,745,654 A | 4/1998 | Titan | |
| 5,757,917 A | 5/1998 | Rose et al. | |
| 5,758,327 A | 5/1998 | Gardner et al. | |
| 5,768,478 A * | 6/1998 | Batten, Jr. | 706/43 |
| 5,790,645 A | 8/1998 | Fawcett et al. | |
| 5,802,256 A * | 9/1998 | Heckerman et al. | 706/59 |
| 5,802,497 A | 9/1998 | Manasse | |
| 5,805,686 A | 9/1998 | Moller et al. | |
| 5,809,144 A | 9/1998 | Sirbu et al. | |
| 5,812,668 A | 9/1998 | Weber | |
| 5,815,657 A | 9/1998 | Williams et al. | |
| 5,819,226 A | 10/1998 | Gopinathan et al. | |
| 5,822,737 A | 10/1998 | Ogram | |
| 5,826,245 A | 10/1998 | Sandberg-Diment | |
| 5,832,465 A * | 11/1998 | Tom | 706/51 |
| 5,850,442 A | 12/1998 | Muftic | |
| 5,870,473 A | 2/1999 | Boesch et al. | |
| 5,875,236 A | 2/1999 | Jankowitz et al. | |
| 5,878,139 A | 3/1999 | Rosen | |
| 5,878,337 A | 3/1999 | Joao et al. | |
| 5,884,289 A | 3/1999 | Anderson et al. | |
| 5,897,621 A | 4/1999 | Boesch et al. | |
| 5,899,980 A | 5/1999 | Wilf et al. | |
| 5,905,736 A | 5/1999 | Ronen et al. | |
| 5,940,529 A * | 8/1999 | Buckley | 382/155 |
| 5,953,710 A * | 9/1999 | Fleming | 705/38 |
| 5,988,497 A | 11/1999 | Wallace | |
| 6,000,608 A | 12/1999 | Dorf | |
| 6,029,154 A * | 2/2000 | Pettitt | 705/44 |
| 6,078,904 A * | 6/2000 | Rebane | 705/36 R |
| 6,094,643 A | 7/2000 | Anderson et al. | |
| 6,163,604 A | 12/2000 | Baulier et al. | |
| 6,182,070 B1 * | 1/2001 | Megiddo et al. | 707/6 |
| 6,189,005 B1 * | 2/2001 | Chakrabarti et al. | 707/6 |
| 6,278,997 B1 * | 8/2001 | Agrawal et al. | 707/6 |
| 6,330,546 B1 * | 12/2001 | Gopinathan et al. | 705/35 |
| 6,336,108 B1 * | 1/2002 | Thiesson et al. | 706/20 |
| 6,345,265 B1 * | 2/2002 | Thiesson et al. | 706/52 |
| 6,363,488 B1 | 3/2002 | Ginter et al. | |
| 6,389,402 B1 | 5/2002 | Ginter et al. | |
| 6,405,179 B1 * | 6/2002 | Rebane | 705/36 R |
| 6,418,436 B1 * | 7/2002 | Degen et al. | 707/6 |
| 6,430,539 B1 | 8/2002 | Lazarus et al. | |
| 6,529,888 B1 * | 3/2003 | Heckerman et al. | 706/45 |
| 6,536,037 B1 * | 3/2003 | Guheen et al. | 717/151 |
| 6,609,118 B1 * | 8/2003 | Khedkar et al. | 705/36 R |
| 6,611,598 B1 * | 8/2003 | Hayosh | 380/54 |
| 6,629,081 B1 * | 9/2003 | Cornelius et al. | 705/30 |
| 6,714,918 B2 * | 3/2004 | Hillmer et al. | 705/18 |

| | | | | |
|---|---|---|---|---|
| 7,069,234 | B1 * | 6/2006 | Cornelius et al. | 705/26 |
| 7,089,428 | B2 * | 8/2006 | Farley et al. | 726/22 |
| 7,167,844 | B1 * | 1/2007 | Leong et al. | 705/80 |
| 7,251,624 | B1 * | 7/2007 | Lee et al. | 705/35 |
| 7,356,503 | B1 * | 4/2008 | Johnson et al. | 705/38 |
| 7,376,618 | B1 * | 5/2008 | Anderson et al. | 705/38 |
| 7,403,922 | B1 * | 7/2008 | Lewis et al. | 705/38 |
| 7,418,417 | B2 * | 8/2008 | Chacko et al. | 705/36 R |
| 2001/0029496 | A1 | 10/2001 | Otto et al. | |
| 2002/0078381 | A1 * | 6/2002 | Farley et al. | 713/201 |
| 2002/0128960 | A1 * | 9/2002 | Lambiotte et al. | 705/38 |
| 2003/0014379 | A1 * | 1/2003 | Saias et al. | 706/45 |
| 2003/0018549 | A1 * | 1/2003 | Fei et al. | 705/30 |
| 2003/0023543 | A1 * | 1/2003 | Gunewardena et al. | 705/38 |
| 2003/0069820 | A1 * | 4/2003 | Hillmer et al. | 705/35 |
| 2003/0097292 | A1 * | 5/2003 | Chen et al. | 705/10 |
| 2004/0054619 | A1 * | 3/2004 | Watson et al. | 705/38 |
| 2004/0064401 | A1 * | 4/2004 | Palaghita et al. | 705/38 |

FOREIGN PATENT DOCUMENTS

| | | |
|---|---|---|
| EP | 0 598 469 A2 | 5/1994 |
| JP | H06-149849 A1 | 5/1994 |
| JP | H07-78165 A1 | 3/1995 |
| JP | H08-504284 A1 | 5/1996 |
| JP | H11-259571 A1 | 9/1999 |
| JP | H11-328318 A1 | 11/1999 |
| JP | 2000-172697 A1 | 6/2000 |
| JP | 2001-109733 A1 | 4/2001 |
| WO | WO 94/06103 | 3/1994 |
| WO | WO 94-06104 | 3/1994 |
| WO | WO 96/31043 | 3/1996 |

OTHER PUBLICATIONS

Cordell, Larry. "Scoring Tools to battle Delinquencies." Mortgage Banking, Feb. 1988, v58 (5), pp. 49-55.*

CyberSource, "CyberSource Enhances Internet Fraud Screen to Combat Credit Card Fraud," Jun. 4, 2001, http://www.cybersource.com/press_room/view.xml?page_id=579, printed Apr. 23, 2002, 3 pages.

CyberSource, "CyberSource® Introduces Credit Card Authorization Service Enhanced with a Powerful Fraud Screening Tool," Jan. 30, 2001, http://www.cybersource.com/press_room/view.xml?page_id=237, printed Apr. 23, 2002, 2 pages.

Techmall, "Meridien Launches New e*Payments Research Service Identifying Web Opportunities And Risk For Retailers And Financial Firms," Dec. 1, 1999, http://www8/techmall.com/techdocs/TS991202-1.html, printed Apr. 23, 2002, 2 pages.

DataCash, "Payment card fraud checking service for e-commerce," http://www.datacash.com/security/fraudscreening.html, printed Apr. 23, 2002, 2 pages.

Eric Bodner, et al., "An Internet Billing Server: Availability, Reliability & Scalability Issues in the MS4 Billing Server Design & Prototype", Carnegie Mellon University, Information Networking Institute, 16 pages.

Eric Bodner, et al., "An Internet Billing Server: Analysis of Distributed Computing and Cross Platform Issues", Carnegie Mellon University, Information Networking Institute, 22 pages.

D. W. Davies, et al., "Security for Computer Networks, An Introduction to Data Security in Teleprocessing and Electronic Funds Transfer", 1984, 386 pages.

S.P. Miller, et al., "Kerberos Authentication and Authorization System", Oct. 27, 1998, Section E.2.1, pp. 1-21.

One page flyer, "Software.net", A Service of CyberSource Corporation, http://software.net, Oct. 1995.

Richard Batelaan, et al., "An Internet Billing Server: System Requirements", Carnegie Mellon University, Information Networking Institute, pp. 1-130.

CyberCash, Inc., "About CyberCash, Inc.", 2000, http://www.cybercash.com/company, 1 page.

Dr. Andreas Schöter, et al., "Digital Money Online A Review of Some Existing Technologies," Feb. 1997, 60 pages.

Danny Cohen, "Computerized Commerce," Oct. 1989, ISI Reprint Series, ISI/RS-89-243, pp. 1095-1099.

Danny Cohen, "Electronic Commerce", Oct. 1989, ISI Research Report, ISI/RR-89-244, pp. 1-42.

CyberSource Corporation, "Largest Internet-Based Electronic Software Superstore, Over 20,000 Software Titles", 1 page.

Richard Batelaan, et al., "An Internet Billing Server Prototype Design", Aug. 10, 1992, Carnegie Mellon University, Information Networking Institute, 1992 Final Project, pp. 1-97.

Eric Bodner, et al., "The Internet Billing Server: Prototype Requirements", Carnegie Mellon University, Information Networking Institute, pp. 1-96.

CyberSource Corporation, "CyberSource IVS™, Internet Fraud Screen with Artificial Intelligence," http://www.cybersource.com/html/solutions/fraud_main.html#overview, printed Dec. 16, 1998, 3 pages.

"Webster's II, New Riverside University Dictionary," The Riverside Publishing Company, 1994, 4 pages.

Eric Bodner, et al., "The Internet Billing Server: Design Document", Carnegie Mellon University, Information Networking Institute, TR 1993-3, pp. 1-131.

Anonymous, "Faster Credit Card Authorization," Chain Store Age Executive with Shopper Center Age, New York, Mar. 1995, http://proquest.umi.com/pqdweb?TS=930258...1&Fmt=3&Sid=1&Idx=7&Deli=1&RQT=309&Dtp=1, printed Jun. 24, 1999, 3 pages.

CyberSource Corporation, "ICS CommerceFLEX™, Developer's Guide and Reference," Apr. 14, 1997, pp. 1-78.

CyberSource Corporation, "Internet Commerce Services, Out-Source or In-House?", undated, 1 page.

CyberSource Corporation, "Electronic Software Distribution, Why use software.net?", undated, 1 page.

CyberSource Corporation, "Advertising Opportunities, Proven Marketing Success", undated, 1 page.

CyberSource Corporation, "Customer Profile, Influencers and Decision Makers", undated, 1 page.

Steve Kichen, "Impulse Items", Forbes, May 8, 1985, 1 page.

Martin Marshall, et al., "Shopping for Software Object on the Web", CommunicationsWeek, Nov. 20, 1995, 1 page.

Hewlett Packard Company, "Software.net, Product Brief", 1995, 4 pages.

Heather Clancy, "Internet Makes Headway As Software Distribution Channel", Computer Reseller News, Nov. 20, 1995, 1 page.

William S. McKiernan, et al., "Microsoft Corp. Chooses Softwave.net™ To Be First To Electronically Deliver Microsoft", Oct. 17, 1995, press release, pp. 1-3.

Joan E. Rigdon, "Microsoft to Sell Most Popular Software Through Resellers Using the Internet", The Wall Street Journal, Oct. 16, 1995, p. B10.

William S. McKiernan, et al., "Software.net™ Opens Internet Product Center To Connect Internet Publishers With Internet Customers", Oct. 23, 1995, Press Release Summary, 4 pages.

Keith Mary Rantas-Drew, et al., "IBM and Cybersource Corporation Tap Into The Power of the Internet to Offer One-Stop Component Shopping", Nov. 13, 1995, Media Information, International Business Machines Corporation, pp. 1-4.

http://components.software.net, "Where Developers Go For Parts", Fact Sheet, 1 page.

Niehaus Ryan Group, "CyberSource's ICS Launch PR Plan", Jan. 14, 1997, 25 pages.

CyberSource Corporation, "CyberSource Internet Commerce Services, The CyberSource Solution for Internet Commerce", 1997, www.cybersource.com, 6 pages.

"CyberSource Corporation, News & Press Release Abstracts", pp. 1-3.

Karen Rodriguez, "CyberSource Sells Software On Internet", Info World Reprint, 1995, Software Distribution On-Line, 1 page.

Joan E. Rigdon, "CyberSource Begins to Offer Software of Symantec and Others on the Internet", The Wall Street Journal, Reprinted Jan. 31, 1995, 1 page.

Bradley F. Shimmin, "Software Sales Brought to the Internet, Software.net expands the sales channel to the World Wide Web", LAN TIMES, vol. 12, Issue 1, Jan. 9, 1995, 1 page.

Clinton Wilder, "Where to Buy Objects Over the Internet, CyberSource Creates First Electronic Store For Software Components", Informationweek, Dec. 11, 1995, 1 page.

Tom Clements, et al., "CyberSource Corporate Backgrounder", CyberSource Corporation, Menlo Park, CA, pp. 1-2.

Tom Clements, et al., "CyberSource's New Internet Commerce Services Provide Software Publishers Turn-Key Electronic Transaction and Distribution Services, *Qualcomm, Insignia, Wall Data and seven other publishers choose CyberSource to distribute products via the Internet*", press release, Apr. 30, 1996, pp. 1-4.

CyberSource Corporation, "Internet Commerce Services, Schedule of Services for Distribution and Merchants", Sep. 6, 1996, pp. 1-11.

CyberSource Corporation, "Merchant Internet Commerce Services, Typical Commerce Site Functions and Integration Check List", 1996, pp. 1-6.

Vijay Hanagandi et al., "Density-Based Clustering and Radial Basis Function Modeling to Generate Credit Card Fraud Scores", Feb. 6, 1996, pp. 247-251.

Rob Kelman, "Content Outline", Marketingworks, CyberSource Capabilities Brochure Outline-Revised, Dec. 10, 1996, pp. 1-7.

Stanley H. Slom, "Check Fraud: Verification Firms Help cut $2.9 Billion Loss," *Stores*, Feb. 1992, 1 page.

Stephen Mak, "Network Based Billing Server", Carnegie Mellon University, Information Networking Institute, 1991, 66 pages.

R. Richardson, "Neural networks compared to statistical techniques", Computational Intelligence for Financial Engineering (CIFEr), 1997; Proceedings of the IEEE/IAFE 1997, pp. 89-95, Mar. 1997, New York City, NY.

S. Ghosh et al., "Credit card fraud detection with a neural-network", System Sciences, 1994, vol. III: Information Systems: Decision Support and Knowledge-Based Systems, Proceedings of the Twenty-Seventh Hawaii International Conference, pp. 621-630, Jan. 4-7, 1994.

"ICS Launch Schedule", undated, pp. 1-2.

"ICS Customers", undated, 1 page.

Lennart Jansson, "General Electronic Payment System", 1985, The New World of the Information Society, pp. 832-837.

Michael Moeller, "New CyberSource of Information, Services Developers can create applications by downloading components," Reprinted from Nov. 20, 1995, PCWeek.

Philip McCrea et al., "The Internet Report" CSIRO Division of Mathematical and Information Sciences, Jun. 1997, pp. 1-184.

Alfuraih, S., et al. "Using Trusted Email to Prevent Credit Card Frauds in Multimedia Products", World Wide Web Internet and Web Information Systems, 5, 2002, pp. 245-256.

Allen, S., "Credit Card Fraudsters? SWAT Them!", On the Line (Mar./Apr. 1997) p. 32.

"An e*guide to Cyberfraud", ClearCommerce Corporation, 1999, pp. 1-9.

"ATACS™: How ATACS Works", Bedford Associates, Inc., 1996.

Cunningham, J. Lawrence, "Cutting cell fraud frequency", Security Management, Oct. 1996, pp. 42-46, vol. 40, No. 10.

"CyberSource® Advanced Fraud Screen Enhanced by Visa®, Implementation Guide", CyberSource Corporation, Jul. 2004, 112 pages.

"CyberSource Corporation, Fraud Control System", CyberSource Corporation, 1996, archived at http://web.archive.org/web/19970110062645/http:/1/cybersource.com/products/fcs.html.

"Frequently Asked Questions", CyberSource Corporation, 1997, archived at http://web.archive.org/web/19971021082803/http://www.cybersource.com/faq/danger.htm.

"Merchant Internet Commerce Services", CyberSource Corporation, 1997, archived at http://web.archive.org/web/19971021082508/www.cybersource.com/service/ivs.htm.

Declaration of Donna Tucker, filed in *In re* Patent Application of: John P. Pettitt, executed on Oct. 8, 2004 (2 pages).

Fawcett, T. et al, "Adaptive Fraud Detection", Data Mining and Knowledge Discover (to appear, 1-28, 1997), Kluwer Academic Publishers, pp. 1-29.

Fawcett, T. et al., "Adaptive Fraud Detection", Data Mining and Knowledge Discovery 1, 1997, pp. 291-316.

Fawcett, T. et al., "Combining Data Mining and Machine Learning for Effective User Profiling", Proceedings of the Second International Conference on Knowledge Discovery and Data Mining, KDD-96, AAAI Press, 1996, pp. 8-13.

Gein, Robert A., et al., "The ABCs of Credit Card Processing", Perspectives, American Public Communications Council Inc., Dec. 1995, pp. 13-18.

Gifford, David K., et al., "Payment Switches for Open Networks", Proceedings of the $40^{th}$ IEEE Computer Society International Conference, 1995, IEEE, pp. 26-31.

Lamm, Stephen E., et al., "Real-Time Geographic Visualization of World Wide Web Traffic", Computer Networks and ISDN Systems 28, 1996, Elsevier Science B. V., pp. 1457-1468.

Newing, R., "Data Mining", Management Accounting, Oct. 1996, pp. 34-36.

Scullin, Will H., et al., "Real-Time Visualization of World Web Traffic", 1995, pp. 1-13.

"SNET Network Fraud Control System", SNET Interconnection Services Group, Jan. 1994 (2 pages).

K. Shinohara, "Notification of Grounds for Rejection" (in Japan patent application 2002-539907), Japan Patent Office, Mar. 13, 2007, 4 pages.

Canadian Office Action received in Application No. 2,426,168 (Apr. 2, 2009) 5 pages.

Current Claims in Application No. 2,426,168 (Apr. 22, 2009) 13 pages.

Office Action for Canadian application No. 2,426,168, mail date Mar. 30, 2010, 4 pages.

Current claims for Canadian application No. 2,426,168, 13 pages.

Kirkwood, Craig W., "Strategic Decision Making" Wadsworth Publishing Company, 1997, pp. 61-80.

* cited by examiner

METHOD AND APPARATUS FOR EVALUATING FRAUD RISK IN AN ELECTRONIC COMMERCE TRANSACTION

CROSS REFERENCE TO RELATED APPLICATIONS

This application claims priority from U.S. Provisional Patent Application No. 60/294,852 filed May 30, 2001, entitled "Method and Apparatus for Evaluating Fraud Risk in an Electronic Commerce Transaction Providing Dynamic Self-Adjusting Multi-Source Adversarial Risk Likelihood Tracking"; and is related to U.S. patent application Ser. No. 09/708,124 filed Nov. 2, 2000, entitled "Method and Apparatus for Evaluating Fraud Risk in an Electronic Transaction"; which are both hereby incorporated by reference in their entirety, as if fully set forth herein, for all purposes.

FIELD OF THE INVENTION

The present invention relates generally to electronic commerce transaction processing and, more specifically, to techniques for evaluating fraud risk in an electronic commerce transaction.

BACKGROUND OF THE INVENTION

Any business that accepts bank or credit cards for payment accepts some amount of risk that the transaction is fraudulent. However, for most merchants the benefits of accepting credit cards outweigh the risks. Conventional "brick and mortar" merchants, as well as mail order and telephone order merchants, have enjoyed years of business expansion resulting from credit card acceptance, supported by industry safeguards and services that are designed to contain and control the risk of fraud.

Credit card transactions are being utilized in a variety of environments. In a typical environment a customer, purchaser or other user provides a merchant with a credit card, and the merchant through various means will verify whether that information is accurate. In one approach, credit card authorization is used. Generally, credit card authorization involves contacting the issuer of the credit card or its agent, typically a bank or a national credit card association, and receiving information about whether or not funds (or credit) are available for payment and whether or not the card number is valid. If the card has not been reported stolen and funds are available, the transaction is authorized. This process results in an automated response to the merchant of "Issuer Approved" or "Issuer Denied." If the merchant has received a credit card number in a "card not present" transaction, such as a telephone order or mail order, then the credit card authorization service is often augmented by other systems, but this is the responsibility of the individual merchant.

For example, referring now to FIG. 1, a typical credit card verification system 100 is shown. In such a system, a merchant 102 receives a credit card from the customer 104. The merchant then verifies the credit card information through an automated address verification system ("AVS") 106. These systems work well in a credit card transaction in which either the customer has a face-to-face meeting with the merchant or the merchant is actually shipping merchandise to the customer's address.

The verification procedure typically includes receiving at the AVS 106 address information and identity information. AVS 106 is currently beneficial for supporting the screening of purchases made by credit card customers of certain banks in the United States. In essence, the bank that issues a credit card from either of the two major brands (Visa or MasterCard) opts whether or not to support the AVS 106 procedure. The AVS check, designed to support mail order and telephone order businesses, is usually run in conjunction with the credit card authorization request. AVS 106 performs an additional check, beyond verifying funds and credit card status, to ensure that elements of the address supplied by the purchaser match those on record with the issuing bank. When a merchant executes an AVS check, the merchant can receive the following responses:

AVS=MATCH—The first four numeric digits of the street address, the first five numeric digits of the ZIP code, and the credit card number match those on record at the bank;

AVS=PARTIAL MATCH—There is a partial match (e.g., street matches but not ZIP code, or ZIP code matches but not street);

AVS=UNAVAILABLE—The system cannot provide a response. This result is returned if the system is down, or the bank card issuer does not support AVS, or the bank card issuer for the credit card used to purchase does not reside in the United States;

AVS=NON-MATCH—There is no match between either the address or ZIP data elements.

While most merchants will not accept orders that result in a response of "Issuer Denied" or "AVS=NON-MATCH," the automated nature of an online transaction requires merchants to implement policies and procedures that can handle instances where the card has been approved, but other data to validate a transaction is questionable. Such instances include cases where the authorization response is "Issuer Approved," but the AVS response is AVS=PARTIAL MATCH, AVS=UNAVAILABLE, or even AVS=MATCH. Thus, the purchaser's bank may approve the transaction, but it is not clear whether the transaction is valid.

Because significant amounts of legitimate sales are associated with AVS responses representing unknown levels of risk (or purchases made outside of the United States where AVS does not apply), it is critical to find ways to maximize valid order acceptance with the lowest possible risk. Categorically denying such orders negatively impacts sales and customer satisfaction, while blind acceptance increases risk. Further, even AVS=MATCH responses carry some risk because stolen card and address information can prompt the AVS=MATCH response.

To address these issues, merchants have augmented card authorization and AVS results with additional screening procedures and systems. One such additional procedure is to manually screen orders. While this approach is somewhat effective when order volume is low, the approach is inefficient and adds operating overhead that cannot scale with the business.

ELECTRONIC COMMERCE

Electronic commerce or online commerce is a rapidly expanding field of retail and business-to-business commerce. In electronic commerce, a buyer or purchaser normally acquires tangible goods or digital goods or services from a merchant or the merchant's agent, in exchange for value that is transferred from the purchaser to the merchant. Electronic commerce over a public network such as the Internet offers an equal or greater business opportunity than conventional, brick-and-mortar business, but requires special precautions to ensure safe business operations. The technological foundation that makes e-shopping compelling—e.g., unconstrained store access, anonymity, shopping speed, and convenience—also provides new ways for thieves, or "fraudsters", to commit credit card fraud.

When a transaction involves transmitting information from an online service or the Internet, address and identity information are not enough to confidently verify that the customer who is purchasing the goods is actually the owner of the credit card. For example, an individual may have both the name and the address of a particular credit card holder and that information in a normal transaction may be sufficient for authorization of such a transaction. However, in an Internet transaction it is possible to obtain all the correct information related to the particular credit card holder through unscrupulous means, and therefore, carry out a fraudulent transaction.

Accordingly, what is needed is a system and method that overcomes the problems associated with a typical verification system for credit card transactions, particularly in the Internet or online services environment. The system should be easily implemented within the existing environment and should also be straightforwardly applied to existing technology.

While not all merchants experience fraud, as it is highly dependent on the nature of the business and products sold, in one study the aggregate risk of fraud was found to range between 4% and 23% of authorized sales transacted, depending upon the lenience of the merchant's acceptance criteria. Because Internet transactions are classified as "Card Not Present" transactions under the operating rules of the major credit card associations, in most cases Internet merchants are liable for a transaction even if the acquiring bank has authorized the transaction. As a result, fraud has a direct and immediate impact on the online merchant.

Electronic commerce fraud is believed to be based largely on identity theft rather than stolen cards. Generally, in electronic commerce fraud that is based on identity theft, the legitimate cardholder does not detect or know that the identifying information or credit card account is being used illegally, until the cardholder reviews a monthly statement and finds fraudulent transactions. In contrast, in a stolen card case, the cardholder has lost possession of the card itself and usually notifies credit card company officials or law enforcement immediately. As a result, the impact of fraud is different in the electronic commerce context; it affects a merchant's operating efficiency, and possibly the merchant's discount rate and ability to accept credit cards.

In one approach, online merchants attempt to avoid this risk by declining all but the safest orders or by instituting manual screening methods. However, merchants using these approaches generally suffer business inefficiency and lost sales. These merchants turn away a significant portion of orders that could have been converted to sales, increase overhead costs, and limit business scalability. Thus both fraud and overly stringent methods or non-automated methods of protecting the business from fraud can negatively impact business operations.

Although risk-susceptible transactions can be tested in a variety of ways for risk indications, none of the resulting risk test outcomes, alone, are sufficient for determining whether the transaction should be accepted or rejected. Each test outcome must be assigned a numeric value or a weighting factor as a component of the overall transaction risk. These components must be combined and the resulting combination risk estimate transformed into a single numeric indicator which can then be used to determine whether the transaction is to be accepted for further processing or reviewed for possible rejection.

In this context, numerous issues deserve attention, concerning:

1. How the individual test outcome penalties are best determined;
2. How the individual test outcome penalties are best combined;
3. How the resulting combination of test outcome penalties should best be shaped or transformed to optimally serve the needs of the decision domain;
4. How more than one such decision-domain-tailored risk estimate or score should be optimally combined through multi-source fusion to create the best single point estimate of risk likelihood; and
5. How to modify that optimal point estimate so that it does not violate the expectations of legacy system users beyond a reasonable limit.

MATHEMATICAL MODELING

Mathematical models are developed in an attempt to approximate the behavior of real-world processes, situations, or entities (hereinafter addressed solely as a "process," for purposes of simplicity and clarity, not for purposes of limitation). A model may be as accurate as it can be at a moment in time, but if the process that is being modeled is changing over time, a static model is likely to diverge from the real-world process that it is attempting to model. Hence, the ability of a static model to predict a real-world result degrades as a result of this divergence.

Dynamic models are developed and deployed to overcome the likelihood and rate of divergence between the model and the process that the model is approximating by attempting to adjust to the changes occurring to the underlying process. Often, models are adjusted in response to some form of feedback representing the changes to the underlying process; at times by adjusting parameters within the model.

A process that is being modeled is adversarial if it is "aware" that it is being modeled and does not want to be modeled. In a sense, the process is actively changed in order to undermine the accuracy and performance of the model being used to predict its behavior. In the domain of fraud risk likelihood tracking, fraudsters are actively trying to undermine the predictive model in order to continue their fraudulent activities, by changing their process.

Based on the foregoing, there is a clear need for an improved method and system for determining a fraud risk associated with an electronic commerce transaction that addresses the foregoing issues.

There is a need for a way to assist merchants in screening fraudulent Internet transactions by calculating and delivering a risk score in real time.

There is also a need for a way to detect a fraud risk associated with an electronic commerce transaction that is based on criteria unique to or specific to the electronic commerce environment and attuned to the kinds of attempts at fraud that are perpetrated by prospective buyers.

There is a specific need for a way to determine a fraud risk associated with an electronic commerce transaction that is useful in a computer-based merchant services system.

SUMMARY OF THE INVENTION

Mechanisms are provided for evaluating the risk of fraud in an electronic transaction. According to one aspect, transaction information from a transaction is received and applied to multiple fraud risk mathematical models that each produce a respective raw score, and the raw scores are transformed with respective sigmoidal transform functions to produce respective optimized likelihood of fraud risk estimates. In one embodiment, the respective risk estimates are combined using fusion proportions associated with the respective risk estimates, producing a single point risk estimate for the transaction, and the single point risk estimate is transformed with a sigmoidal function to produce an optimized single point risk estimate for the transaction.

The sigmoidal functions are derived, according to one embodiment, to approximate an observed relationship between risk estimates produced by fraud risk detection models and a percentage of transactions associated with respective risk estimates, where the relationship is represented in terms of real-world fraudulent transaction and non-fraudulent transaction distributions. In an additional embodiment, the sigmoidal functions are derived by constraining the respective functions to the abscissas of the following three inflection points: (1) a first point, at which the slope of the fraudulent transaction distribution becomes mathematically trivial in proximity to zero percentage transactions; (2) a second point, at which the slope of the non-fraudulent transaction distribution becomes mathematically trivial in proximity to zero percentage transactions; and (3) a third point, at which the fraudulent and non-fraudulent transaction distributions intersect.

In one embodiment, derivations of the sigmoidal functions are controlled such that they are dynamically adjustable based on the change to the observed relationship represented by the real-world transaction distributions. Each inflection point determines a defining transition point on the mapping between a raw score and its sigmoidal transformation as follows: (1) the first inflection point determines where the sigmoidal transfer function enters the transition from low to medium risk. (2) the second inflection point determines where the sigmoidal transfer function surface transitions from concave to convex, corresponding to the maximally confusable mid range of risk, and (3) the third inflection point determines where the sigmoidal transfer function transitions from medium to high risk.

One embodiment is directed to computing respective risk test penalties for multiple risk tests for one or more of the multiple fraud risk mathematical models that are used to estimate the likelihood of fraud, given a certain pattern of events represented by the transaction information. The respective risk test penalties are computed as the inverse of the sum of one and a false positive ratio for the respective risk test. In another embodiment, a weighted summation of the respective risk test penalties is computed to produce the raw score from the associated model for the transaction.

Various implementations of the techniques described are embodied in methods, systems, apparatus, and in computer-readable media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for evaluating fraud risk in an electronic commerce transaction. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various modifications to the described embodiment will be readily apparent to those skilled in the art and the generic principles herein may be applied to other embodiments. Thus, the present invention is not intended to be limited to the embodiment shown but is to be accorded the widest scope consistent with the principles and features described herein.

Fraud Detection System—General

Figure 1:
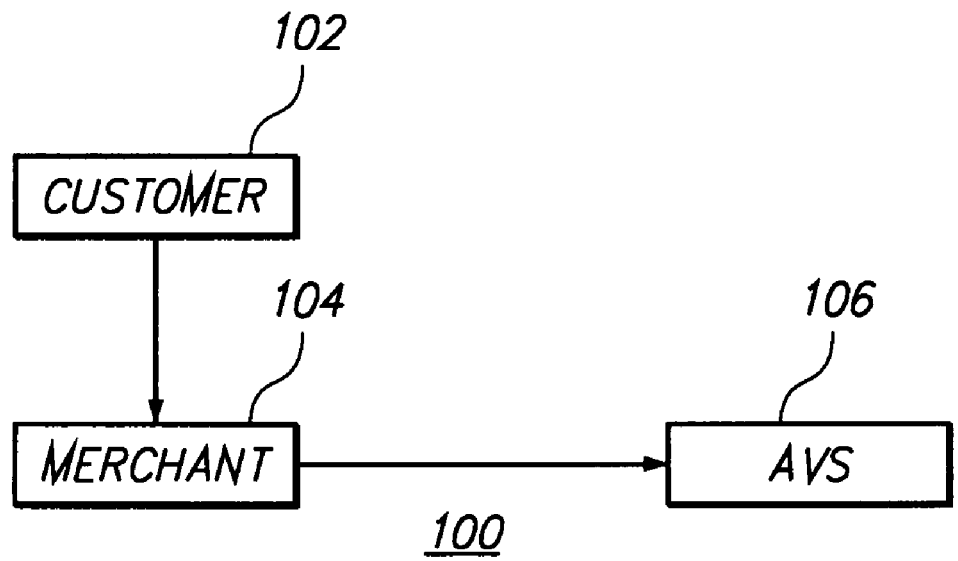
FIG. 1 is a block diagram illustrating a typical credit card verification system.
Figure 2:
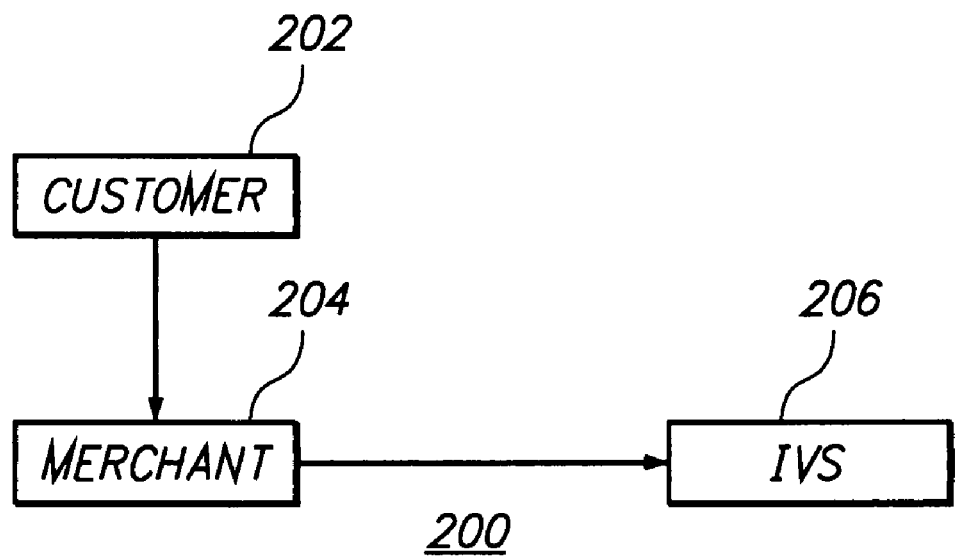
FIG. 2 is a block diagram illustrating a system that would use the verification procedure in accordance with the present invention.

The present invention may operate in an integrated verification system for credit card transactions over an online service or the Internet. FIG. 2 is a block diagram of a system 200 which uses verification as described herein. System 200 includes, similar to FIG. 1, a customer 102 and a merchant 104. The customer 102 provides the merchant with credit card and other pertinent information (e.g., customer's e-mail address), and the merchant then sends the information to an integrated verification system ("IVS") 206, to determine whether the credit card information is valid. The IVS 206 is typically implemented in software, for example on a hard disk, floppy disk or other computer-readable medium.

Different verification parameters that the IVS 206 utilizes are typically weighted relative to the particular credit card transaction. For example, if the amount of dollar transaction is critical, it may be appropriate to weight a history check (for verifying the history of transactions associated with the particular credit card information) and an AVS system check more critically than other parameters. On the other hand, if a critical point is the consistency of the Internet address, then a consistency check (for verifying consistency of the credit card information) and an Internet identification system (for verifying validity of Internet addresses) may be more critical. Accordingly, each of the verification parameters may be weighted differently depending upon its importance in the overall transaction verification process to provide a merchant with an accurate quantifiable indication as to whether the transaction is fraudulent.

Figure 3:
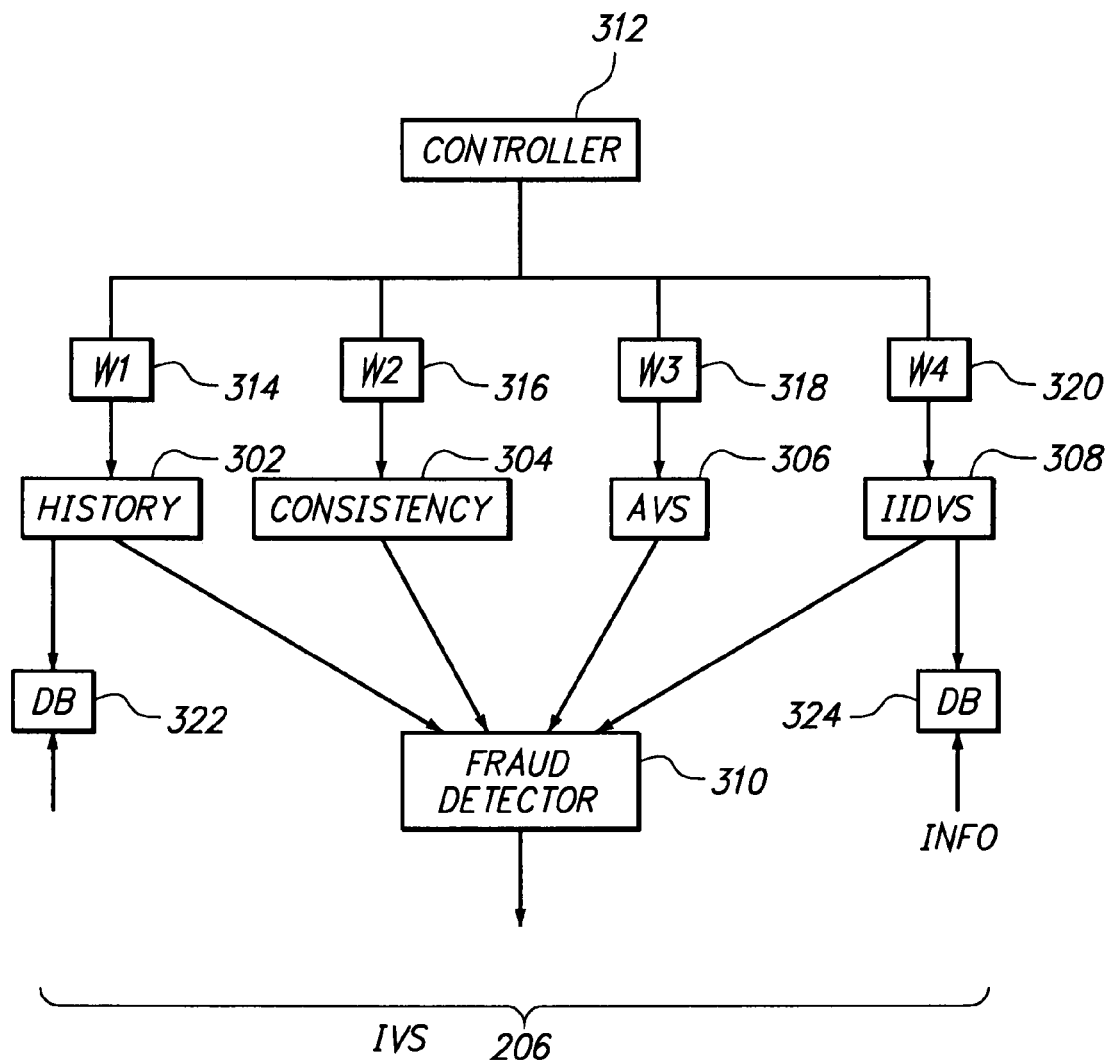
FIG. 3 is a block diagram illustrating an integrated verification of a credit card transaction over the Internet.

FIG. 3 shows a simple block diagram for providing an integrated verification of a credit card transaction over the Internet. The IVS 206 (FIG. 2) includes a controller 312 that receives the credit information from the merchant and then sends that information on to a variety of parameters 302-308. The plurality of parameters 302-308 operate on the information to provide an indication of whether the transaction is valid. In this embodiment, the plurality of parameters comprises a history check 302, a consistency check 304, an automatic verification system 306 and an Internet identification verification system ("IIVS") 308. The output or individual indications of validity of these parameters are provided to fraud detector 310. The fraud detector 310 combines these inputs to provide an integrated indication of whether the particular transaction is valid.

Consistency check 304 allows IVS 206 to determine whether the credit information is consistent, i.e., does the credit information match the user and other information. AVS system 306 provides similar information as does AVS 106 as described in reference to FIG. 1. A key feature of both the history database 322 and the Internet ID database 324 is that they can be accessed and the information there within can be supplemented by a variety of other merchants and, therefore, information from those merchants is obtainable thereby.

History check 302 is provided which also accesses a history database 322 which may include card number and email information. The history check 302 will also actively determine if the particular transaction matches previous database information within the history database 322. Therefore, the Internet ID verification system 308 and history check 302 increases in utility over time. The Internet ID verification system 308 provides for a system for verifying the validity of an Internet address, the details of which will be discussed hereinafter. The Internet identification verification system 308 similar to the history check 302 includes a database 324 which can be supplemented by other merchants. In addition, the Internet identification verification system 308 accesses and communicates with a database of Internet addresses. This system will be used to verify whether the Internet address is consistent with other Internet addresses being used in transactions utilizing this credit card.

Fraud Risk Mathematical Models

1. Statistical Modeling

A statistical model (such as statistical model 1040 of FIG. 10B) comprises a plurality of computations that are based upon actual discrete scores that are weighted in nonlinear combination, based on likelihood of indicating an actual fraudulent transaction. In one embodiment, such weighting involves identifying orders that are actually consummated and that result in actual charge-backs to the issuing bank associated with the credit card that is identified in the order. The methodology generally ignores orders that are rejected by the fraud screening system disclosed herein as part of the transaction present tests 1010 of FIG. 10B.

Figure 4:
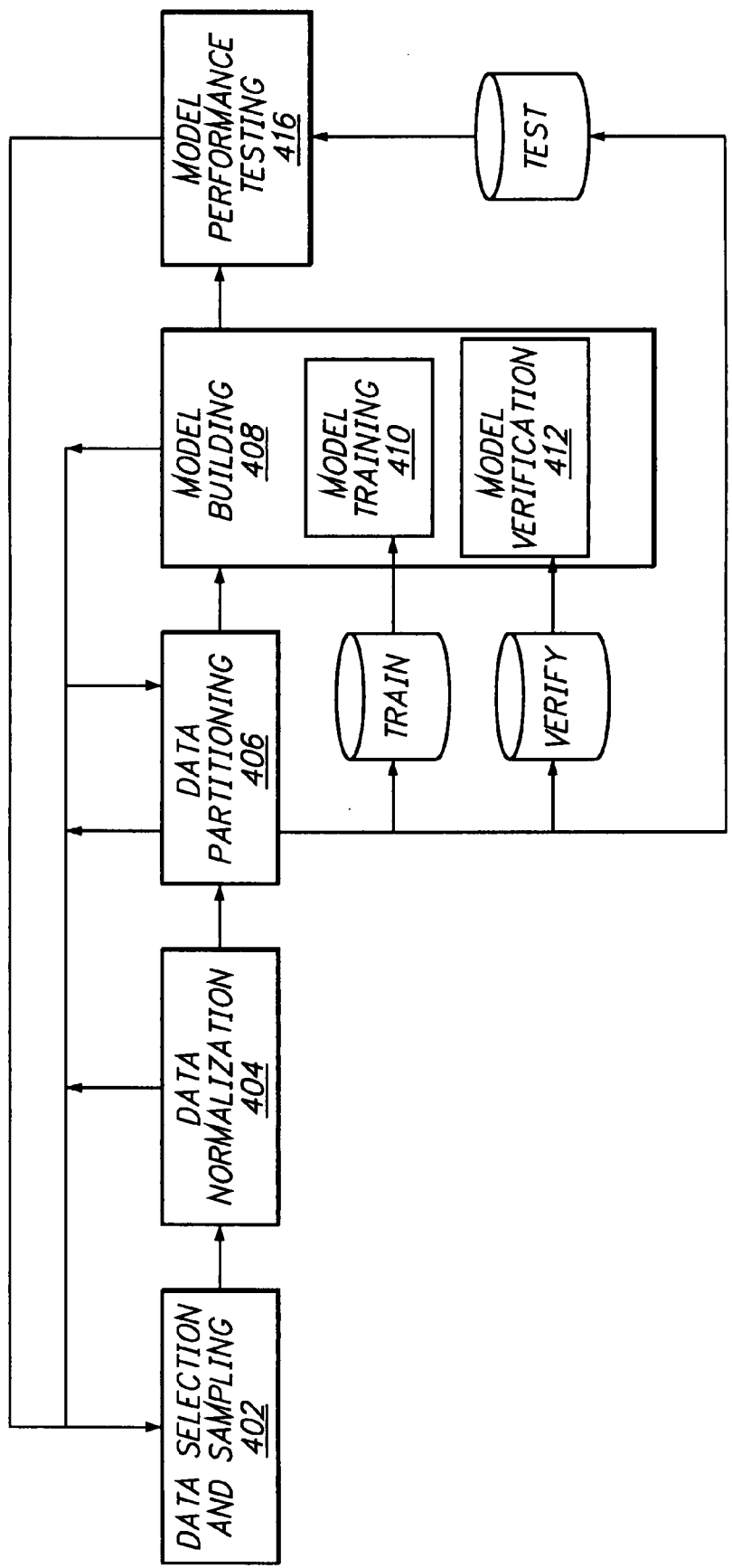
FIG. 4 is a block diagram illustrating a statistical modeling process.

FIG. 4 is a block diagram of a statistical modeling process. In one embodiment, statistical modeling consists of a data selection and sampling phase 402, data normalization phase 404, data partitioning phase 406, model training phase 410, model verification phase 412, and model performance testing phase 418. Many of these phases can contribute feedback to earlier phases, as indicated by paths in FIG. 4.

A. Data Selection and Sampling

In general, phase 402 of the statistical modeling process consists of data selection and sampling. The word "data", in this context, refers to truth-marked transaction data. "Truth-marked" means that the transaction records include a field indicating the final outcome of the transaction—whether the transaction ultimately resulted in an adverse outcome such as chargeback or suspicious credit back, or the transaction resulted in a good sale. During this phase the sources of truth-marked modeling data are selected. If the model is to provide custom protection to a single merchant, then data specific to that merchant would dominate but the modeling set might also contain representative data from similar merchants as well to broaden the modeling basis. If the model were to serve an entire industry sector then the data would be chosen broadly to represent the sector merchants. However broad the applicability of the model, the data selection is equally broad.

However, this transaction data is not used for statistical modeling as-is; it is down-sampled. Down-sampling is a statistical process by which the modeler achieves an optimal balance between high-risk and low-risk transactions in the modeling set through biased random sampling. The modeler establishes the optimal mix proportions based on theoretical characteristics of the model that is to be built. For example, in many cases, high-risk transactions are rare in relation to low-risk. If the selected data is used for modeling as-is, the low-risk transactions could dominate and drown out the signal from the infrequent high-risk items. A balance is desirable. Typically, a ten-to-one ratio of low-risk to high-risk data items is obtained, by accepting all high-risk items in the selected data set and then randomly down-sampling the low-risk items, to achieve the desired ratio.

B. Data Normalization

Statistical modeling schemes typically respond best to data that are numerically well-behaved. Since transaction data and test result data can, in principle, contain values from all across the numeric spectrum, the data are normalized by applying the statistical Z-transform or some other such transform to achieve equal interval measurement across models and to fit all data values into a specified range, such as from minus one to plus one, or less optimally from zero to one. This makes the modeling task more stable and the results more robust. These functions are carried out in data normalization phase 404.

C. Data Partitioning

In data partitioning phase 406, the selected and sampled data is broken down into three partitions or mutually exclusive data sets: a training set, a verification set, and a testing set. Although there is no required proportion for these data sets, proportions such as 50-50 and 60-40 are commonly used. For example, using the 60-40 proportion, 60 percent of the modeling data is randomly chosen for training and validation, and the remaining 40 percent is held aside or held back as testing data for the model testing phase. The 60 percent chosen for model building is further broken down according to another rule of thumb such as 65-35 into training data and validation data, both of which participate in a model building phase 408. All partitioning is done using pseudo-random number generation algorithms.

D. Model Training

Once the modeling data are selected, sampled, normalized, and partitioned, model training phase 410 is carried out. The first step is to select or create an initial candidate model architecture. For non-linear statistical models such as neural networks and basis function networks, this involves configuring the input layer to conform to the dimensionality of the modeling data feature set, configuring the output layer to conform to the demands of the model domain, and then selecting an initial number of "hidden units" or "basis function units". If the demands of the model domain are to make a simple numeric estimation of the transaction risk, then a single unit output architecture is chosen. If the modeling domain demands that the transaction be categorized into multiple risk type estimates, then the output layer is made to conform to the dimensionality of the target category set.

With each successive training cycle, the model is exposed to the training data one transaction at a time and allowed to self-adjust the model weights attempting to achieve a "best balance" in the face of the entire data set—a balance between correct risk estimation for the low-risk transactions and correct risk estimation for the high-risk transactions. The training cycle is terminated when the rate of successful weight adjustment, as measured by successive improvements in mean square error, begins to asymptote or flatten out. Training beyond that point may result in "over-fit" where the model becomes so specifically conditioned to the training data that later, in the performance testing phase, it will fail to generalize to previously unseen but similar patterns of data. If the model fails to train to criteria, then the modeler returns to one of the previous steps and enters the modeling cycle again, adjusting to prevent the modeling failure on the next cycle. The most common step for modeling entry is to return to the beginning of the model-training phase and make adjustments to the architecture, although it is not uncommon to go back to the data selection and sampling phase if necessary.

E. Model Verification

The model-in-training, or the completely trained model, or both, are subjected to verification in model verification phase 412. During this phase the behavior of the model is checked against common sense criteria by bringing some of the verification data to bear on the model. In a way this is an interim form of performance testing. The difference is that, once adjustments are made to the model, the verification data that was used to determine the nature of the required model change becomes part of the ongoing training set. Typically, after a cycle of verification reveals some model weakness, the modeling process is re-entered at one of the earlier stages. This cycling between model training phase 410, model verification phase 412, model adjustment, and model re-training concludes the general model building phase 408.

F. Model Testing

Once model building cycles have completed, the finished model is subjected to model performance testing in testing phase 416. The 40-50 percent of the original selected and sampled data that was held back for performance testing is now brought to bear. The model has never been exposed to this transaction data before. The model scores all of the remaining data, without allowing any modifications to be made to its weights or architecture. The results of scoring are analyzed. If the model has performed to criteria, modeling is completed and the statistical model is ready for deployment in the production fraud risk estimation system where it will be exposed to transactions as they are presented to the system in real time and produce a numeric risk estimate for each transaction. That numeric risk estimate can be interpreted as fraud likelihood, the likelihood that the transaction will turn out to be bad.

If the model does not perform to criteria, the modeling process begins again from the beginning with a new data selection and sampling cycle, as shown in FIG. 4. This renewed modeling process can be used to extend the underperforming model or to begin a new model, incorporating lessons learned during the previous modeling cycles.

2. Heuristic Modeling

A heuristic model (such as Heuristic Model 1050 of FIG. 10B) is comprised of one or more artificial intelligence computations that compute a weighted sum based on a linear combination of the discrete scores generated by other models or tests. The heuristic computations are performed on the results of the heuristic tests. This is a highly complex scoring process that occurs in stages and results in a single numeric estimation of risk. This risk estimate can then serve as the basis for a score blending process (such as Score Blending Process 1052 of FIG. 10B), establishing the Risk Zones that structure the blending process. This blending process is discussed in detail below.

Initially, a total raw score is computed as the weighted sum of the discrete test results. Discrete test results are of four types: Boolean, quantitative, categorical, and probabilistic. Boolean true-false results are valued at zero or one. Quantitative results are valued as positive integers reflecting arithmetic counts of occurrence or magnitude. Categorical results indicate discrete categories of information related to levels of risk severity. Probabilistic results indicate levels of estimation confidence pertaining to uncertain risk indicators. Each discrete test result is multiplied by an associated penalty value, and these products are summed together to produce the total raw score. The penalty associated with each test can be negative or positive. Negative penalties reduce the likelihood of risk and positive penalties increase the risk likelihood. The resulting total raw score indicates the face value and situational risk of the transaction.

Next, the heuristic model computes a raw score multiplier. The raw score multiplier is similar to a "gain control" device. The raw score is boosted upward or reduced based on a combination of certain test results and the merchant's declared policy toward those test results. If the merchant has indicated a special interest in a particular test, then the results of that test are magnified to boost the score upward or downward—mostly upward. Based on the merchant preferences for specified tests, and on those test results, a score multiplier is computed and applied to the total raw score resulting in a "classic" score. The resulting classic score ranges in value from 0 to a very large number which can be greater than 100,000 and in its upper ranges appear to be sparsely distributed exponentially.

Finally, the classic score is scaled and transformed into a non-linear bounded estimate of the likelihood of transaction risk by sigmoidally superimposing the raw score distribution onto the inflection points of the underlying decision domain. This Heuristic Model score ranges from 0 to 99 and is an estimate of risk likelihood. This heuristic estimate is later combined with the results of other models through a process of numeric fusion described below.

3. Risk Estimate Blending

Figure 5:
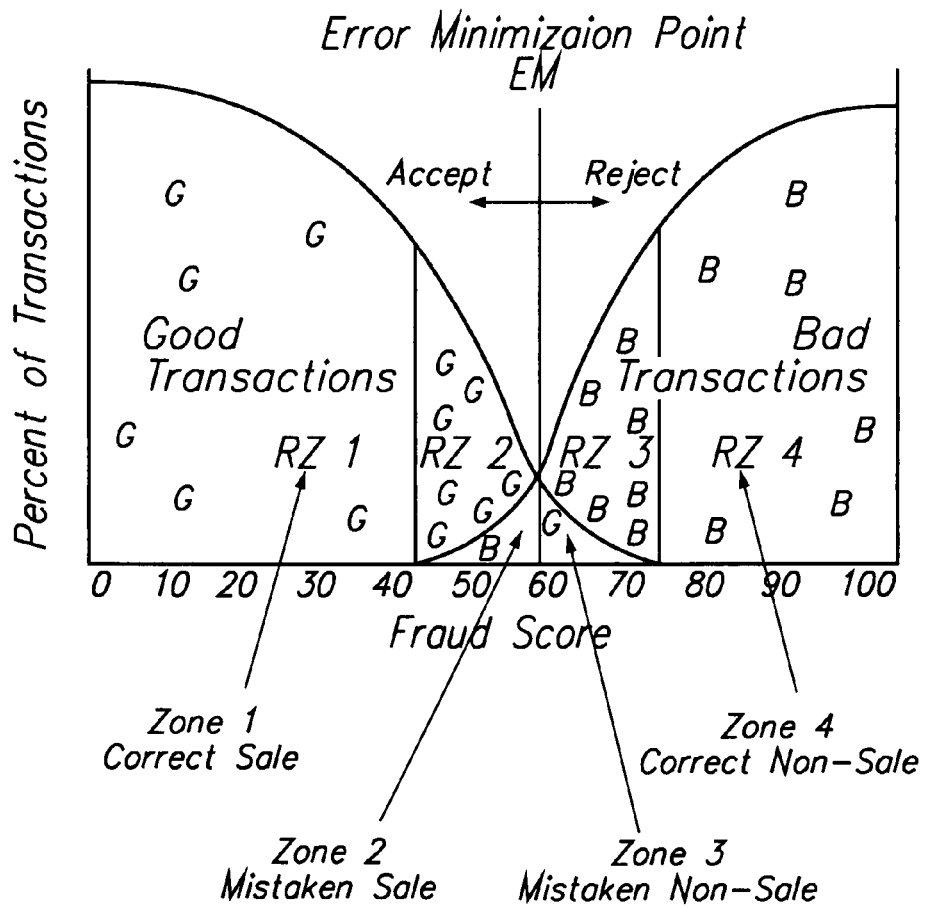
FIG. 5 is a graph illustrating two frequency distributions: the score distribution of Good Transactions and that of Bad Transactions.

All risk likelihood estimates derived from the heuristic, statistical, and other models can be sigmoidally transformed (as described above) and then blended or fused to produce a final comprehensive estimate of the likelihood of risk associated with the transaction-merchant-card-fraudster combination. This is commonly called the Fraud Score, and is called the Risk Estimate herein. The blending (described in more detail below under the heading "Multi-Source Diagnostic Fusion Component") is carried out using certain values derived from analyzing transaction distributions, which are illustrated in FIG. 5. For illustrating the process of risk estimate fusion, a two model example will be presented consisting of a heuristic model and a statistical model.

FIG. 5 shows two frequency distributions: the score distribution of Good Transactions and that of Bad Transactions. By overlaying the distribution of Risk Estimates observed for truly bad transactions on the distribution of truly good transactions, four Risk Zones are established. Risk Zone 1 begins at the lowest risk likelihood (Risk Score 0) and extends to the first inflection point where the occurrence of fraud transactions becomes nontrivial. Risk Zone 1 contains low-scoring transactions that are highly unlikely to be fraudulent.

Referring again to FIG. 5, Risk Zone 2 begins in the general non-fraud zone at the first inflection point where the occurrence of fraud transactions becomes non-trivial and extends to the second inflection point, which is the intersection of the Good Transactions frequency surface and the Bad Transactions frequency surface. That boundary is also defined as Error Minimization (EM) point, the point that balances the risk of Type I and Type II Error and is traditionally recommended as a default discrete decision threshold. Risk Zone 2 contains mostly non-fraudulent transactions but also a mix of mid-low scoring fraudulent transactions. Type II Errors (also known as Misses, Missed Detections, Mistaken Sales, and Fraud Losses) occur when fraudulent transactions score in Risk Zones 1 and 2 and are thus mistakenly accepted for processing.

Risk Zone 3 of FIG. 5 begins at the default Error Minimization second inflection point and extends to the third inflection point in the general fraud zone where the occurrence of non-fraudulent transactions becomes trivial. Risk Zone 3 contains mostly fraudulent transactions but also a mix of mid-high scoring non-fraudulent transactions. Risk Zone 4 begins at the third inflection point where the occurrence of mid-high scoring non-fraudulent transactions becomes trivial and extends to the top of the scoring range. Risk Zone 4 contains high-scoring transactions that are extremely likely to be fraudulent. Type I Errors (also known as False Alarms, False Positives, Mistaken Non-Sales, and Lost Business Opportunities) occur when non-fraudulent transactions score in Risk Zones 3 and 4 and are thus mistakenly rejected from processing.

According to one embodiment, the score value (Risk Estimate) of statistical models and heuristic models are blended in a score blending process, generally as follows. For each of the four Risk Zones, a blending policy is established and enforced, dictating the magnitude and the allowable direction of influence the models are permitted. The policies are a function of both the nature of the risk estimation algorithms yielding the scores being blended, and the nature of the Risk Zones themselves.

In one embodiment, the Heuristic Model is taken as the basic scoring authority for establishing the boundaries of all Risk Zones. In this embodiment, a Statistical Model is intended primarily to protect non-fraudulent transactions from mistakenly receiving a high Risk Estimation (to prevention of False Alarms), and since most non-fraudulent transactions naturally fall in Risk Zones 1 and 2, the Statistical Model is given increased responsibility for reducing Risk Estimations in Zone 1 and limited authority to reduce Risk Estimations in Zone 2. Further, in this example embodiment, since the Heuristic Model is intended primarily to optimize the detection of fraudulent transactions (and thus to avoid Misses); and since most fraudulent transactions naturally fall in Zones 3 and 4, that model is given full responsibility for producing Risk Estimates in Zone 4 and primary responsibility for producing Risk Estimates in Risk Zone 3. The Statistical Model is then given limited authority to decrease certain Risk Estimates in Zone 3.

In another embodiment, the Heuristic Model is taken as the basic scoring authority for establishing the boundaries of all Risk Zones. In this embodiment, a Statistical Model is intended primarily to prevent fraudulent transactions from mistakenly receiving a low Risk Estimation (for prevention of Missed Detections). Since most fraudulent transactions naturally fall in Risk Zones 3 and 4, the Statistical Model is given increased responsibility for increasing Risk Estimations in Zone 1 and limited authority to increase Risk Estimations in Zone 2. Further, in this example embodiment, since the Heuristic Model is intended primarily to optimize the detection of fraudulent transactions (and thus to avoid Misses), and since most fraudulent transactions naturally fall in Zones 3 and 4, that model is given full responsibility for producing the basic Risk Estimates in Zone 4 and primary responsibility for producing Risk Estimates in Risk Zone 3. The Statistical Model is then given limited authority to increase Risk Estimates in Zones 2 and 3.

If the risk estimation scores of a collection of models-to-be-fused do not agree, special Limit Surface Logic is applied to minimize either False Alarms or Misses, as the case may be, depending on a merchant-specific Ideal Tradeoff Ratio reflecting each merchant's preference between fraud loss and lost business opportunity.

The Ideal Tradeoff Ratio (ITR) is a statement of a merchant's preference for one risk type (e.g., fraud loss=Type II Error) to another (e.g., lost business opportunity=Type I Error). For example, a 2:1 ITR implies that, for a particular merchant, two fraud losses cost as much as one lost sale (i.e., that a $2 fraud transaction costs the merchant the same loss as the failure to consummate a good $1 transaction). Ideal Tradeoff Ratio is a function of cost-of-goods-sold (COGS) and/or return-on-investment (ROI). If the merchant's COGS is relatively high, and thus the per item ROI is relatively low, the merchant will prefer a lost business opportunity over a fraud loss. In contrast, if the COGS is relatively low, and thus the per item ROI is relatively high, the merchant will have a higher tolerance for a fraud loss than for a lost business opportunity.

Figure 6:
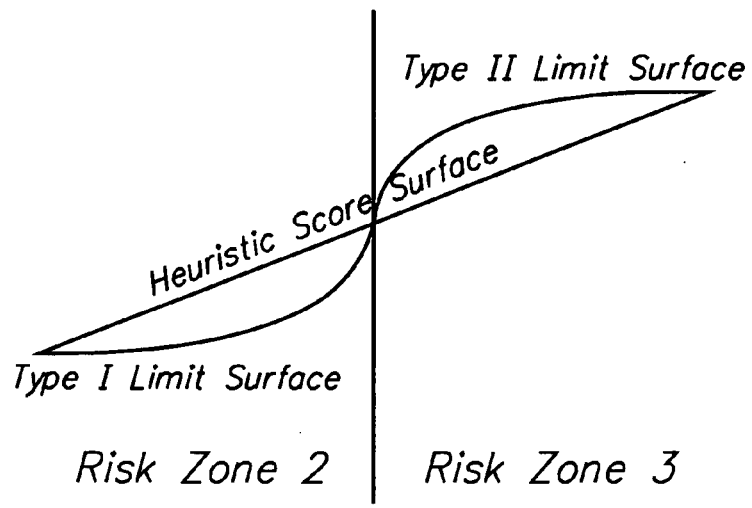
FIG. 6 is a graph illustrating a Limit Surface established below the Heuristic Score Surface to help minimize the likelihood of Type I Errors and a Limit Surface established above the Heuristic Score Surface to help minimize the likelihood of Type II Errors.

Referring now to FIG. 6, a Limit Surface (Type I Limit) is established below the Heuristic Score Surface to help minimize the likelihood of Type I Errors; and a Limit Surface (Type II Limit) is established above the Heuristic Score Surface to help minimize the likelihood of Type II Errors.

If the Heuristic Model Risk Estimate falls in Zone 2 and the Statistical Model Risk Estimate falls between the Type I Limit Surface and the Heuristic Model Surface, the Statistical Model Risk Estimate is allowed to reduce the final Risk Estimate for the apparently non-fraudulent transaction. Otherwise the Heuristic Model produces the final Risk Estimate.

If the Heuristic Model Score falls in Zone 3 and the Statistical Model Score falls between the Type II Limit Surface and the Heuristic Model Surface, the Statistical Model Score is allowed to increase the final Risk Estimate. Otherwise, the Heuristic Model produces the final Risk Estimate.

In general, the contribution of parallel models to the final Risk Estimate is determined during blending by considering the strengths and weaknesses of each model to be blended, in light of the distribution characteristics of the various Risk Zones. The model contributions are adjusted to achieve the Ideal Tradeoff Ratio specified by each merchant.

Dynamic Self-Adjusting Multi-Source Adversarial Risk Likelihood Tracking Mechanism In one approach to evaluating fraud risk, a weighted summation of risk probabilities is transformed by applying a series of multi-dimensional sigmoidal surface filters with adjustable inflection points to create the optimal balance between maximal risk detection, minimal false positive exposure, and acceptable review levels.

Figure 9:
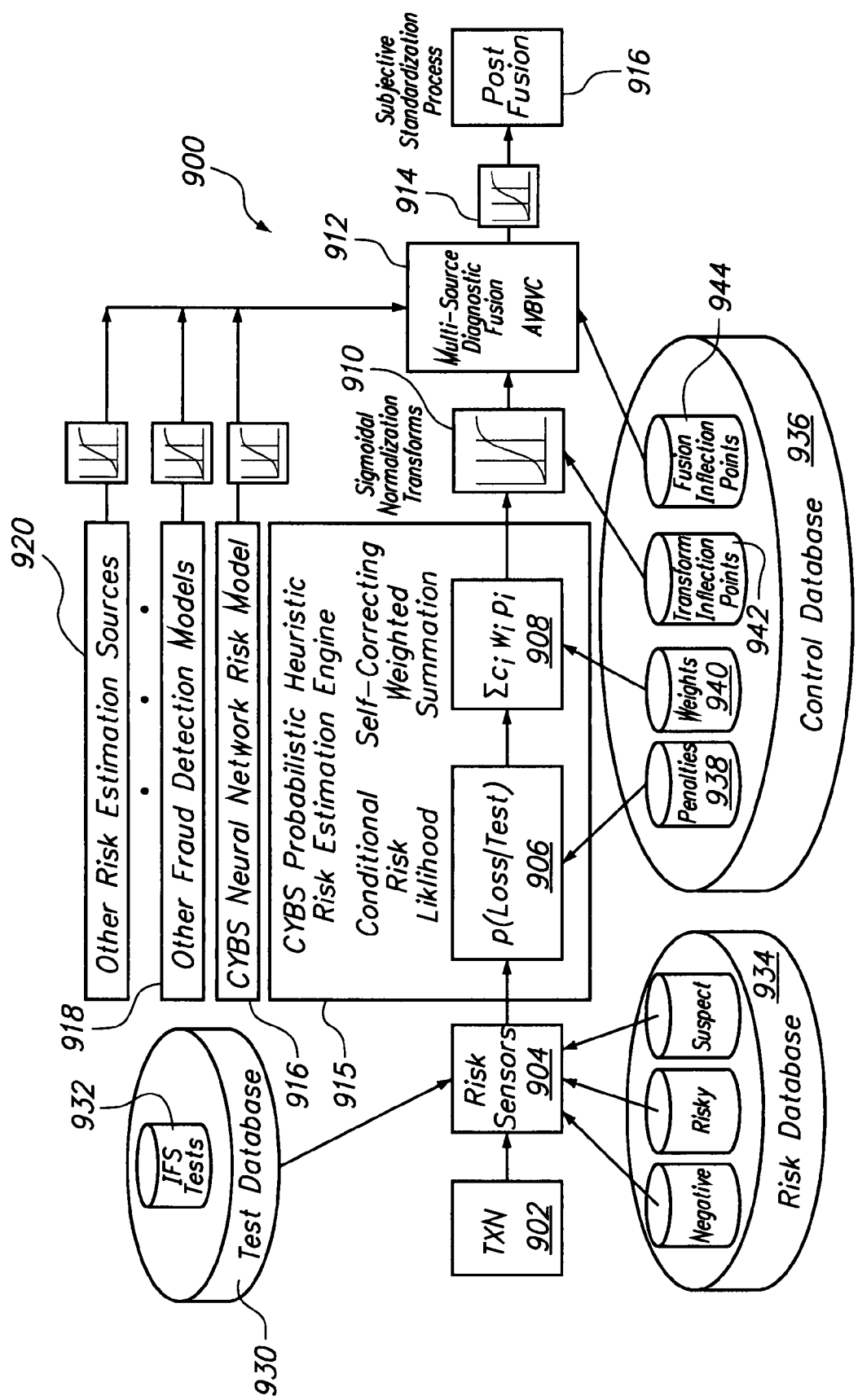
FIG. 9 is a block diagram illustrating an example transaction risk assessment system.

In this approach, five solution components are provided, which are depicted in FIG. 9 and are now described in sequence. Each of the components may be implemented in the form of one or more computer programs, or other software elements (e.g., stored procedures in a database), or in one or more hardware elements, or in a combination of hardware and software elements. Furthermore, the techniques provided herein may be implemented to be programmatically executed by a computer, whereby one or more processors execute software code to electronically apply logic embodied in the software code.

A. Balanced Probabilistic Penalties Component

Fraud risk models attempt to reduce losses from fraudulent transactions, thus, the rules or tests constituent to a model are assigned atomistic weights relative to the respective penalty that each test contributes to the overall probabilistic conclusion derived from the model, or conglomeration of tests. Respective test penalties should reflect the statistical reality, or probability, of fraud given observation of a pattern specified in the respective test.

A Balanced Risk Probabilistic Penalties (Risk Penalties) component of the risk likelihood tracking mechanism addresses the problem of how the individual test result contributions (penalties) to the overall risk estimate are best determined. In one embodiment, it derives individual test outcome penalties from two sets of actuarial data: the Known Risk Data Sample and the General Data Sample (General Sample).

The Known Risk Data Sample (Risk Sample) consists of a set of transactions of known high risk. The General Sample consists of a much larger randomly sampled set of transactions, known to be mostly risk-free but known also to contain some risky transactions. Due to the randomness of the selection process, the percentage of risky transactions in the General Sample is known to approximate the rate and pattern of occurrence of risky transactions in the universe of all transactions.

The Detection Potential of any individual risk test is approximated by calculating the detection rate of that test in the Risk Sample. Across a range of reasonable estimates for attempted fraud, the Detection Potential of each individual test is used to determine how many fraudulent transactions are expected to be detected by that test in the General Sample. The number of transactions that exceed a decision threshold ("Alarms") is then calculated corresponding to the occurrence of each test in the General Sample across a wide range of decision thresholds. The corresponding ratio of correct risk detections to incorrect referrals ("False Positive Ratio") is calculated.

A risk test penalty, $p_i$, for test i is computed, in one embodiment, according to the formula:

$$p_i = 1.0/(1.0 + \text{False Positive Ratio of test } i)$$

This penalty formula is internal to a risk model and reflects the actuarial conditional probability of risk for each test expressed as a function of the false positive ratio, that is, the likelihood of fraud on any transaction given that the individual test has alarmed. The false positive ratio reflects the number of false alarms incurred from a test for every correct fraud detection from the same test, and is typically used by merchants to adjust their transaction rejection thresholds. This penalty estimate strikes an optimal balance between risk detection power and false positive avoidance at realistic levels of attempted fraud across a wide range of decision threshold values.

B. Adjusted Weighted Summation Component

An Adjusted Weighted Summation component addresses the problem of how the individual test outcome penalties are best combined by computing a Weighted Risk Summation of the activated Probabilistic Penalties according to the general weighted sum algorithm:

$$\Sigma w_i c_i p_i$$

where '$w_i$' refers to the weight of test sensor 'i', '$c_i$' refers to the certainty associated with that test sensor, and '$p_i$' refers to the probabilistic risk test penalty associated with Risk Test 'i'.

The certainty factors reflect confidence in the reliability of each test. Thus, the certainty $c_i$ for a given test is occasionally updated based upon changes in the confidence in the reliability of the given test. A change in confidence in the reliability of any given test is typically driven by data representing the ongoing real-world transactions. Hence, the confidence in a given test is often related to the reliability and accuracy of the input data, i.e., the available collection of knowledge about real-world credit card transactions, both fraudulent and non-fraudulent.

Furthermore, if the ongoing transaction data indicated that a false positive ratio for a given test has changed, the risk penalty $p_i$ is also updated. In one embodiment, the certainty factors and risk penalties periodically update themselves through accessing and processing the collection of transaction data, using algorithms to determine whether updates are necessary. Hence, these parameters are not dynamic, but dynamically self-adjusting to ongoing real-world transaction data. The frequency and manner in which the certainty factors and risk penalties are updated are a matter of implementation, and thus, should not be construed as limiting the scope of the invention unless otherwise presented herein.

The weights reflect the 'importance' of each test under modeling assumptions, that is, the importance of a given test in a particular model in view of other tests constituent to the same model. For instance, a model can be represented as a weight vector. Such models could be used to maintain differing patterns of Risk Test importance for different baskets of goods, different merchants, different industry segments and so on. The use of weight vectors in this way allows for models to be stored and calculated in the most efficient way, and supports dynamic model update. In one embodiment, the weights are subject to merchant specific tuning and can thus be adjusted according to customer preferences. Finally, the Weighted Risk Sum is then adjusted to compensate for the size of the Risk Test Set that actually made non-zero contribution to the Weighted Risk Sum, resulting in an Adjusted Weighted Risk Sum. This adjustment prevents a large Weighted Risk Sum from building up artificially from a large number of very small Test Risk Outcome Penalties.

C. Sigmoidal Decision Transform Component

A sigmoidal decision transform component addresses the question of how the resulting combination of test outcome penalties (the Adjusted Weighted Risk Sum) should best be shaped or transformed to optimally serve the needs of the decision domain. In other words, the decision transform component serves as an optimization tuner for the fraud risk mathematical models relative to the underlying real-world transaction domain, correcting for inherent deficiencies in the respective models. For example, a model based on transaction information from the banking sector is not likely accurate in all areas of the decision domain because the banking sector might not receive formal notification of all possibly fraudulent transactions. For another example, neural network models are limited in effectiveness simply due to the neural modeling process. All models have strengths to be exploited or weaknesses for which to compensate during the fusion process.

Use of sigmoidal transform functions provides the functionality of this component and is applicable to all of the mathematical models, but may be implemented to effect the results of only one or more of the models or of all of the models used in a comprehensive risk evaluation/likelihood estimation scheme. Furthermore, each respective mathematical model can be optimized by a separate respective sigmoidal transform function.

Typically, risk managers want to know how likely it is that a decision will have adverse or favorable consequences. They require a risk estimate that reflects the probability of loss vs. gain. Such estimates are most straightforwardly stated in terms of probabilities. The Sigmoidal Transform computes a number in the range 0-100 to reflect the percent likelihood of risk associated with each model and/or with the fusion result. A score of zero reflects no risk, zero percent risk likelihood. A score of 50 reflects a 50% risk likelihood (and conversely a 50% likelihood of non-risk), while a score of 100 reflects a 100% certainty concerning the likelihood of risk.

In the general fusion case, the sigmoidal decision transform component must achieve this mapping by superimposing the classical contour of a sigmoidal function onto the underlying domain pattern of classical detection tradeoff theory. For classical detections of risk, there are four possible outcomes: (1) non-risk was correctly decided; (2) risk was present but failed to be detected; (3) non-risk was mistakenly classified as risk; and (4) risk was correctly detected.

Figure 7:
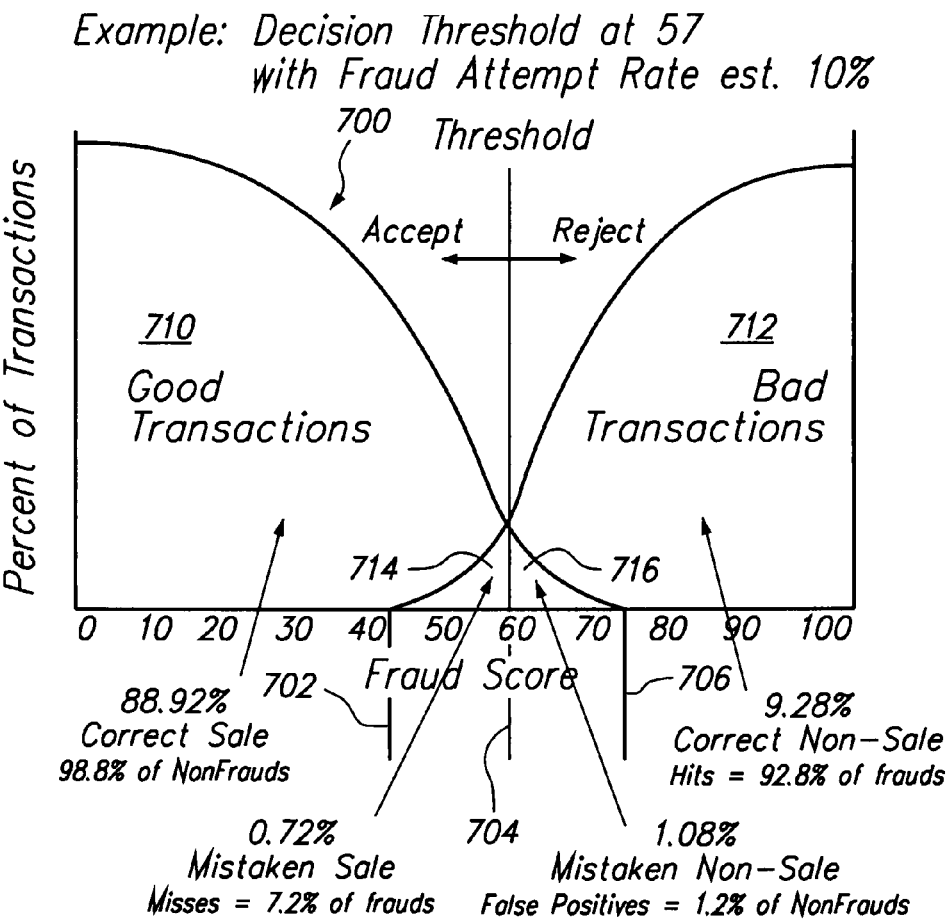
FIG. 7 is a graph illustrating possible outcomes from a classical fraud detection risk assessment.

FIG. 7 is a graph illustrating the foregoing four outcomes. In the example of FIG. 7, a decision threshold value of 57 is assumed, and a fraud attempt rate estimated at 10% is assumed. The resulting graph 700 has four decision zones comprising a Good Transactions zone 710, Bad Transactions zone 712, Mistaken Sale zone 714, and Mistaken Non-Sale zone 716.

The relationship between the four classes of outcome is characterized by three important decision points (sometimes referred to as inflection points):

(1) The point on the x-axis (the point on the Risk Estimate line) where Failures-To-Detect-Fraud (Mistaken Sales) begin to occur in significant numbers (e.g., point 702), that is, where the slope of the fraudulent transaction distribution becomes mathematically trivial in proximity to zero percentage transactions (i.e., y-axis approaching zero);

(2) The point on the x-axis where the number of Mistaken Rejections become insignificantly small (e.g., point 706), that is, where the slope of the non-fraudulent transaction distribution becomes mathematically trivial in proximity to zero percentage transactions (i.e., y-axis approaching zero); and (3) The point on the x-axis where Failures-To-Detect-Fraud and Mistaken-Rejections-Of-Good-Transactions (Mistaken Non-Sales) are equal (e.g., point 1204), that is, where the fraudulent and non-fraudulent distributions intersect.

A sigmoidal surface is used in mathematics to represent the results of various kinds of transforms. A classical sigmoidal surface also has three important points:

(1) The point on the x-axis where the slope of the transform becomes significant;

(2) The point on the transform where the significant slope stops increasing and begins to decrease; and (3) The point on the x-axis where the slope of the transform becomes insignificantly small.

In this description, such points of a sigmoidal surface are termed the inflection points of the sigmoidal transform function. According to the approach herein, a classical sigmoidal surface is mapped onto the decision domain by aligning the inflection points of the sigmoidal surface with the decision points of the underlying domain pattern of classical detection tradeoff theory (e.g., the real-world transaction data represented, for example, as fraudulent and non-fraudulent transaction distributions).

Figure 8:
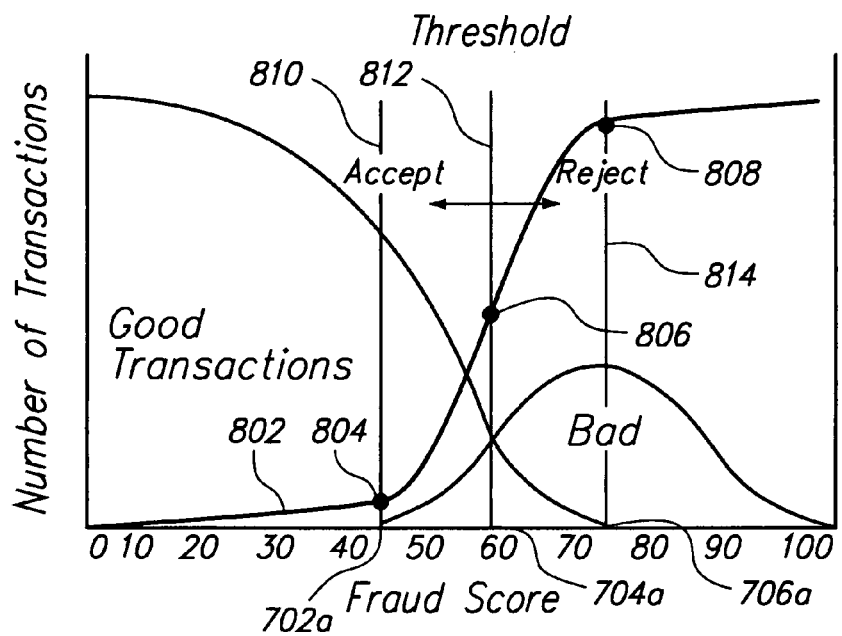
FIG. 8 is a graph illustrating a mapping of a sigmoidal transform surface onto the decision domain.

FIG. 8 is a graph illustrating a mapping of a sigmoidal transform surface onto the decision domain of FIG. 7 by aligning the inflection points (described above) of a classical sigmoidal surface with the decision points (described above) of the underlying transaction data. A resulting sigmoidal surface 802 has inflection points 804, 806, 808. The first inflection point 804 is aligned with the x-axis value of the first decision point 702A, as indicated by alignment line 810. A second inflection point 806 is aligned with the x-axis value of the second decision point 704A, as indicated by alignment line 812. The third decision point 808 is aligned with the x-axis value of the third decision point 706A, as indicated by alignment line 814. The parameters reflecting the mapping of sigmoidal inflection points to underlying transaction decision points are used to define various respective sigmoidal transform functions for respective fraud risk mathematical models, and can be stored in a database for access and dynamic adjustment processes.

In one embodiment, the inflection points are determined by the underlying domain of fraudulent and non-fraudulent transaction distributions. The remaining segments of the sigmoidal surface are determined by the standard formula for the sigmoidal function being used. If the sigmoidal function being used was, for instance, the logistic function, that would determine the resulting surface under the constraints imposed by mapping the inflection points to the decision points.

As a result, the Weighted Risk Sum is transformed into a 100 point percentage risk likelihood estimate. Within the areas where mistakes of classification are usually made—e.g., Mistaken Sale zone 714 or Mistaken Non-Sale zone 716 of FIG. 7, which produce the highest rates of False Positives and False Negatives—the resulting sigmoidal transform provides maximal discrimination power, resulting in the ability to fine-tune the transform for optimal accuracy. Hence, the models used in the risk likelihood estimation system will provide better performance across all merchants and their respective thresholds, and the transformation of raw scores into transformed scores is more likely to produce an optimum outcome. In one embodiment, additional benefits are provided by allowing dynamic adjustment of the inflection points, thus allowing the decision surface to track changing patterns of risk vs. non-risk based on statistical analysis of the ongoing, real-time transaction stream.

D. Multi-Source Diagnostic Fusion Component

The Multi-Source Diagnostic Fusion component addresses the question of how more than one such decision domain tailored risk estimate (The Risk Liklihood Estimate) or score should be optimally combined through multi-source fusion to create the best single point estimate of risk likelihood. In general, in a risk evaluation system there may be two or more risk likelihood recommendations that need to be fused. For example, there may be two or more risk scoring model outputs or recommendations, which may possibly be conflicting. Each model may have different accuracies with respect to a different range of score space or risk space. Traditional heuristic approaches to conflict resolution include simply computing the arithmetic mean or average of the outputs, consensus conflict resolution in which a consensus output is used, and a winner-take-all scheme in which the most accurate model for a given score is used. These traditional approaches are inadequate. Therefore, there is a need to blend or fuse the model results in a way that is more accurate than all of the prior methods and to perform a final optimal blending based on merchant's Ideal Tradeoff Ratios.

Figure 15:
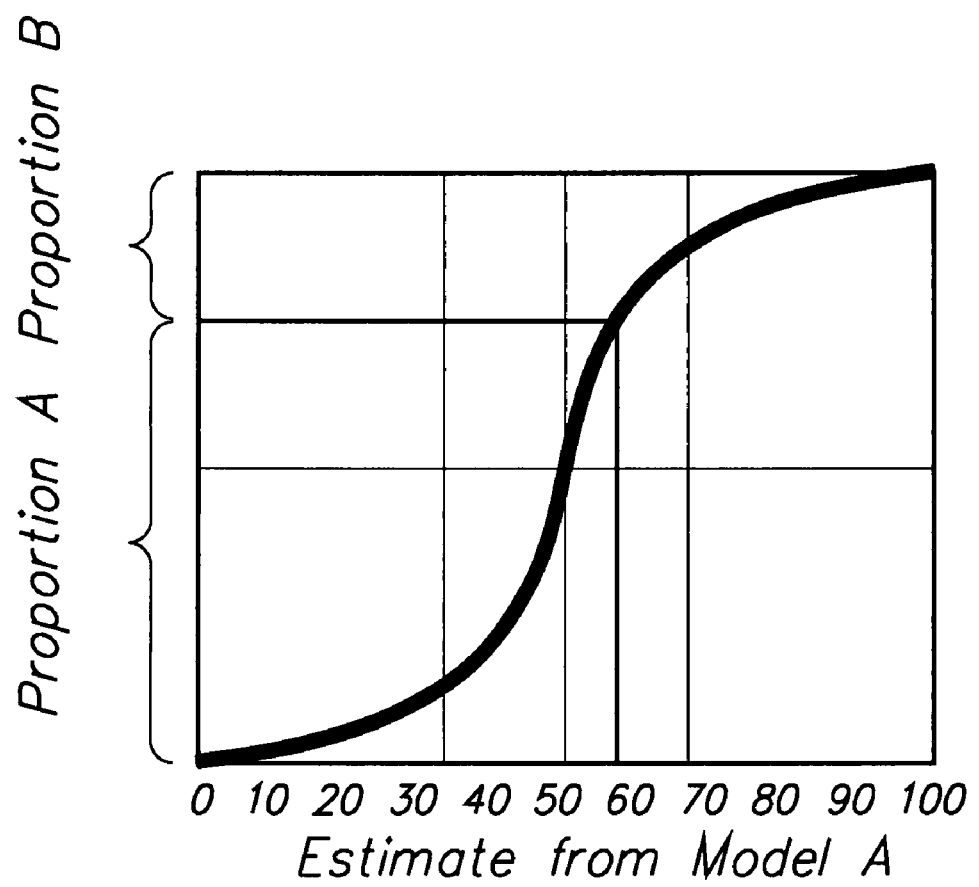
FIG. 15 is a graph illustrating example fusion proportions.

In one approach, weights are assigned to recommendations that are more accurate for the current range. This is achieved by creating a multi-dimensional n-space sigmoidal surface corresponding to the two-dimensional surface described above but with one dimension for every score or risk estimate to be fused. Fusion proportions are determined by calculating the point in n-space where the n scores-to-be-fused and the n-dimensional sigmoidal surface (superimposed on the underlying decision domain) intersect. In the three-dimensional case, Scoring Models A, B, and C are to be combined. The Fusion Proportions of A vs. B, B vs. C, and A vs. C are determined as illustrated in FIG. 15. In this example it is evident that, from the perspective of Model A, at this Model A score magnitude (approx. 57), the fusion ratio should be 75:25 in favor of Model A. These fusion proportions can also be computed for 3-way and, in general, n-way model combinations.

In one embodiment, termed "pair-wise", each pair-proportion is determined from the standpoint of both pair members. For example, the $A \otimes B$ fusion proportion is determined from both the perspective of A (as illustrated) and from the perspective of B. In the three-Model example, this would yield the following proportional recommendations: $A \otimes B \Psi A$, $A \otimes B \Psi B$, $B \otimes C \Psi B$, $B \otimes C \Psi C$, $A \otimes C \Psi A$, and $A \otimes C \Psi C$, where the notation $A \otimes B \Psi A$ refers to the fusion of model scores A and B from the perspective of model score A. These six fusion proportion recommendations would be reduced to a single $A \otimes B \otimes C$ proportion recommendation through the use of any good non-linear classification algorithm such as the radial or elliptical basis-function algorithms. The result might be, in this example, a recommended fusion proportion for A:B:C of 65:25:10, for instance. These proportions could then be used as weights and the fusion accomplished as a weighted average. Alternatively, a non-linear algorithm such as the feed-forward neural network could be trained to make the final optimal blending. Optimality criteria are stated in the following explanation of n-space surface selection.

The n-dimensional surface that determines these pair-wise fusion proportions is chosen or produced so that the resulting fusion proportions result in the optimal balance between detection power and false positive error across the range of decision thresholds and estimated fraud attempt rates. The simplest way to produce the superset of surfaces from which to choose the optimal one would be through the use of a generate-and-test algorithm, but more powerful and optimal surface prediction algorithms are supported.

Models-to-be-fused can be combined both in series and in parallel. To this end, the fusion framework supports the following fusion algebra. Models-to-be-fused can be combined through the use of any n-tuple aggregation fusion algorithm $\otimes_n$. Given three models-to-be-fused A, B, and C, and two fusion algorithms $\otimes_1$ and $\otimes_2$; Models A-B-C can be fused in parallel as $(A \otimes_1 B \otimes_1 C)$ or in series as $((A \otimes_1 B) \otimes_2 C)$, $((A \otimes_2 C) \otimes_1 B))$, or $A \otimes_2 (B \otimes_1 C)$, allowing for maximal flexibility of fusion function composition. This approach allows the order of pair-fusions, or more generally the order of n-tuple-fusions, and the fusion techniques themselves to be determined according to a theoretically optimal min-max criterion such as $\{\max(\text{detect}(A \otimes B \otimes C)), \min(\text{falsePositive}(A \otimes B \otimes C))\}$, or any other desirable fusion criteria.

E. Post-Fusion Min-Max Component

A Post-Fusion Min-Max component addresses the question of how to modify that optimal point estimate (The Multi-Source Risk Estimate) so that it does not violate the expectations of experienced system users beyond a reasonable limit. This is achieved through the statistical derivation of an acceptable Minimum Penalty for each domain condition capable of violating such expectations. The Maximum of the Multi-Source Risk Estimate and the Expectation Minimums serves as the final risk estimate.

F. Example System Architecture

FIG. 9 is a block diagram of an example transaction risk assessment system 900 that embodies the foregoing approach.

Transactions to be evaluated, denoted by TXN block 902, enter the system and are subjected to analysis by a number of individual risk tests that are carried out by risk sensors 904. Input to risk sensors 904 may include transactions in a test database 930, such as fraud screening system transactions 932. Risk sensors 904 also are guided by information in a risk database 934 that includes examples of negative transactions, risky transactions, and suspect transactions. Each model in the system includes multiple risk tests, as described above.

Each risk test that alarms on a given transaction contributes a balanced probabilistic risk penalty, which is the conditional risk likelihood associated with that test in the presence of the transaction. As indicated by block 906, a determination of the risk penalty value for a risk test is made, which, in general, is the likelihood of risk balanced against the likelihood of non-risk given that an individual Risk Test alarmed. Such determination may be computed as (p(Loss|Test), wherein a risk penalty value p is the likelihood of loss given the alarming of a particular test. Penalty values 938 from control database 936 may contribute to the determination at block 906. As described above, in one embodiment, the risk penalty for a given risk test i is determined according to the equation: $p_i = 1.0/(1.0 + \text{False Positive Ratio of test } i)$.

The risk penalties that are determined for the multiple tests within a given model are weighted at block 908 (Self-Correcting Weighted Summation) using weight values 940 from control database 936, and summed, resulting in creating and storing a summation value. As described above, in one embodiment, an adjusted weighted risk sum of risk penalties for a given model is determined according to the equation: $\Sigma w_i c_i p_i$.

The adjusted weighted risk sum is output from a given model and transformed into probabilistic decision space through the use of a sigmoidal transform function, as indicated by block 910 (Sigmoidal Normalization Transform). Values for transform inflection points 942, as described above, are obtained from control database 936. As illustrated in FIG. 9, risk assessment system 900 can have multiple constituent risk models, with different processes and algorithms running as part of each model. The methods presented above for computation of the risk penalties and the weighted summations are but one of multiple possible implementations. Therefore, the scope of the invention is not limited to any particular fraud risk assessment model, or limited to any particular algorithms or processes within a particular model.

The resulting risk likelihood estimates computed from the fraud risk assessment models are then integrated with any number of other such risk estimates through a process of Multi-Source Diagnostic Fusion, as indicated by block 912. In one embodiment, the fusion process is as described above. Fusion inflection points 944 contribute to multi-source diagnostic fusion in block 912.

The other models computing risk estimates may include, as non-limiting examples, a CyberSource neural network risk model 916, other fraud detection model(s) 918, and any number of other risk estimation sources 920. Typically, a different sigmoidal normalization transform 910 is derived for each model 915, 916, 918, and 920. However, the invention is not limited to use of different normalization transforms for the different models.

Furthermore, in one embodiment, a post-fusion transformation 914 is performed on the fused single point risk estimate according to another sigmoidal transform function, to optimize the single point risk estimate even further toward the real-world decision domain. Values for transform inflection points for post-fusion transformation 914 are also typically obtained from control database 936. The post-fusion transform inflection points may, or may not, be equivalent to various transform inflection points 942 used for the sigmoidal normalization transforms 910. The resulting multi-source risk estimate is compared against expectation minimums during a post fusion process 916, whereby the maximum can serve as the final risk estimate for the transaction risk assessment system 900.

In this approach, test penalties are statistically derived from actuarial data to reflect the actual probabilistic risk of loss given that the test alarmed. This probabilistic risk of loss includes both negative losses (due to fraud, non-payment, etc) and positive losses (due to lost profit opportunities). Thus, the test penalties reflect the actual risk to the merchant in relation to each transaction that alarms a test.

Individual fraud risk assessment models can be maintained as weight vectors. Thus, models can be maintained to reflect the risks associated with categories of goods sold, geographic delivery locations, merchant groups, or even individual merchants. Furthermore, weighted summations of risk carry the unwanted side effect that a plurality of small risk likelihood values will add up, creating an artificial appearance of high risk. The self-correcting feature of the weighted summation eliminates this error.

Sigmoidal score transformations (e.g., Sigmoidal Normalization Transform 910), multi-source diagnostic fusion 912, and post-fusion transformation 914 depend on the creation of a multi-dimensional surface with adjustable inflection points. The inflection points, and the resulting sigmoidal surfaces are superimposed onto the underlying decision domain through a set of dynamically adjustable "inflection points", allowing the modeler to fit the sigmoidal surface directly onto the domain of interest. Common sigmoidal transforms do not have the flexibility to fit underlying task domains in this way. In this approach, individual score transformation patterns are maintained as a simple vector of three (x, y) points in raw-score-input by transformed-score-output space. This allows fine-tuning of the important relationship between review rate, risk detection rate, and false positive ratio.

In the same way, the multi-source fusion process is tailored to the decision domain. Because of the shifting nature of adversarial modeling, it is necessary to constantly adjust the fusion proportions of a multi-source model. The dynamically adjustable inflection points of the multi-source n-dimensional sigmoidal surface allow its fusion proportions to be dynamically adjusted to remain in optimal register with the problem domain.

Fraud Screening and Scoring System—General

According to one implementation, the present invention operates in an Internet fraud screening system that examines e-commerce transactions and measures the level of risk associated with each transaction, returning a related risk score back to the merchant in real time. In one aspect, the system uses data validation, highly predictive artificial intelligence pattern matching, network data aggregation and negative file checks to examine numerous factors to calculate fraud risk.

According to one embodiment, the system uses scoring algorithms that are regularly refined through the use of a dynamic closed-loop risk modeling process that enables the service provided by the system to be fine-tuned to adapt to new or changing fraud patterns. Operationally, merchants can request the fraud screening service from the system over the Internet using a secure, open messaging protocol. Upon receipt, the fraud screening system performs several levels of analysis which may include, for example without limitation, utilizing the data elements submitted with the order to perform data integrity checks and correlation analyses based on the characteristics of the transaction, as well as comparative analysis of the current transaction profile against profiles of known fraudulent transactions and a referenced search of the transaction history database to identify abnormal velocity patterns, name and address changes, and known defrauders. A risk score is thereby generated and compared to the merchant's specified risk threshold, which may vary depending on the type of transaction or product/service being exchanged. The result is in turn returned to the merchant for transaction disposition.

Figure 10A:
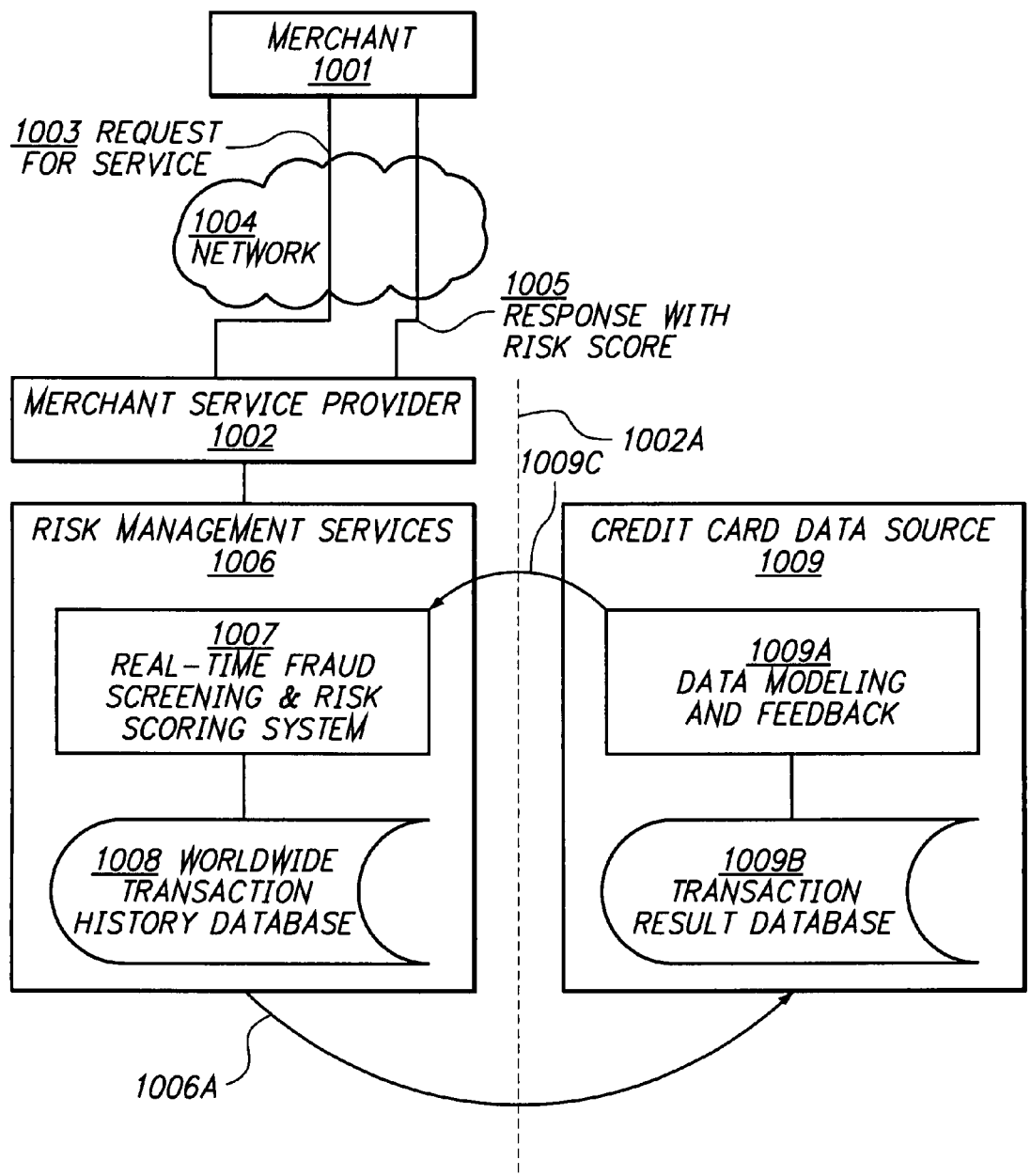
FIG. 10A is a block diagram illustrating a general fraud screening system, in which embodiments of the invention may be implemented.

FIG. 10A is a block diagram showing a general fraud screening system, in which embodiments of the invention may be implemented, including the context in which the fraud screening system may operate.

A merchant 1001 sends a request for service 1003 through one or more networks 1004 to a merchant service provider 1002, and receives a response 1005 that contains a risk score for a particular transaction. Merchant 1001, in FIG. 10A, may comprise one or more software elements that are associated with an online merchant, such as computer programs, Web application programs, CGI or Perl scripts, etc.

Merchant service provider 1002 is an entity that provides electronic commerce services to online merchants. Such services may include, for example, transaction risk management services (including, e.g., fraud screening), payment services, tax computation services, fulfillment management, distribution control, etc. Merchant service provider 1002 provides such services by or through one or more software elements that communicate through network 1004. For example, the Internet Commerce Suite of CyberSource Corporation (Mountain View, Calif.) may provide such services. The foregoing information about merchant service provider 1002 is provided only to illustrate an example operational context of the invention and does not constitute a required element of the invention.

Network 1004 is one or more local area networks, wide area networks, internetworks, etc. In one embodiment, network 1004 represents the global, packet-switched collection of internetworks known as the Internet. Although one merchant 1001 is shown in FIG. 10A for purposes of illustrating an example, in a practical system, there may be any number of merchants. Request 1003 and response 1005 may be routed over secure channels between merchant 1001 and merchant service provider 1002. In one particular embodiment, each request 1003 and response 1005 is a message that conforms to the Simple Commerce Message Protocol ("SCMP") of CyberSource Corporation.

In one embodiment, one of the services provided by merchant service provider 1002 is risk management services 1006. As part of risk management services 1006, merchant service provider 1002 offers a real-time fraud screening and risk scoring system 1007. The fraud screening and risk scoring system 1007 interacts with a worldwide transaction history database 1008 that contains records of a large plurality of past, completed electronic commerce transactions. In this configuration, fraud screening and risk scoring system 1007 can receive the request for service 1003, consult transaction history database 1008, perform various fraud screening checks, and create and store a risk score for the transaction. When fraud screening is complete, the risk score for the transaction is returned to the merchant in response 1005.

Fraud screening and risk management system 1007 communicates over secure paths 1006A, 1009C with a credit card data source 1009 that has a data modeling and feedback mechanism 1009A and a transaction result database 1009B. Credit card data source 1009 is any institution or system that maintains a database of information representing a large plurality of actual credit card transactions, including both successful, non-fraudulent transactions and transactions that result in charge-backs by an acquiring bank to a card-issuing bank. In one embodiment, credit card data source 1009 is associated with one of the major national credit card associations and therefore includes a large database of credit card transaction and charge-back data.

As discussed further herein, fraud screening and risk scoring system 1007 may use one or more computer-implemented models that include one or more tests and mathematical algorithms to evaluate fraud risk associated with a transaction. The performance of the screening and scoring system may be refined in terms of predictability and accuracy by carrying out data modeling, model output optimization, and feedback based on risk score values generated by the system in comparison to information in transaction result database 1009B.

For example, assume that fraud screening and risk scoring system 1007 receives transaction information and assigns a risk score value that indicates a relatively low risk associated with completing the transaction. However, the transaction is in fact fraudulent and results in a charge-back request from the cardholder's card issuer to the merchant 1001. The charge-back request is processed by the credit card data source 1009 and a record of it is made in transaction result database 1009B. In this scenario, merchant service provider 1002 can improve the performance of fraud screening and risk scoring system 1007 by periodically exchanging transaction information and risk score values with credit card data source 1009 over path 1006A, and reviewing matching information in transaction result database 1009B. Based on characteristics of the matching information, credit card data source 1009 can carry out data modeling and feedback 1009A and provide revised weight values, discrete score values, or even new statistical algorithms over path 1009C to fraud screening and risk scoring system 1007. The fraud screening and risk scoring system 1007 may then use the new information to carry out subsequent screening evaluations with improved accuracy.

Figure 10B:
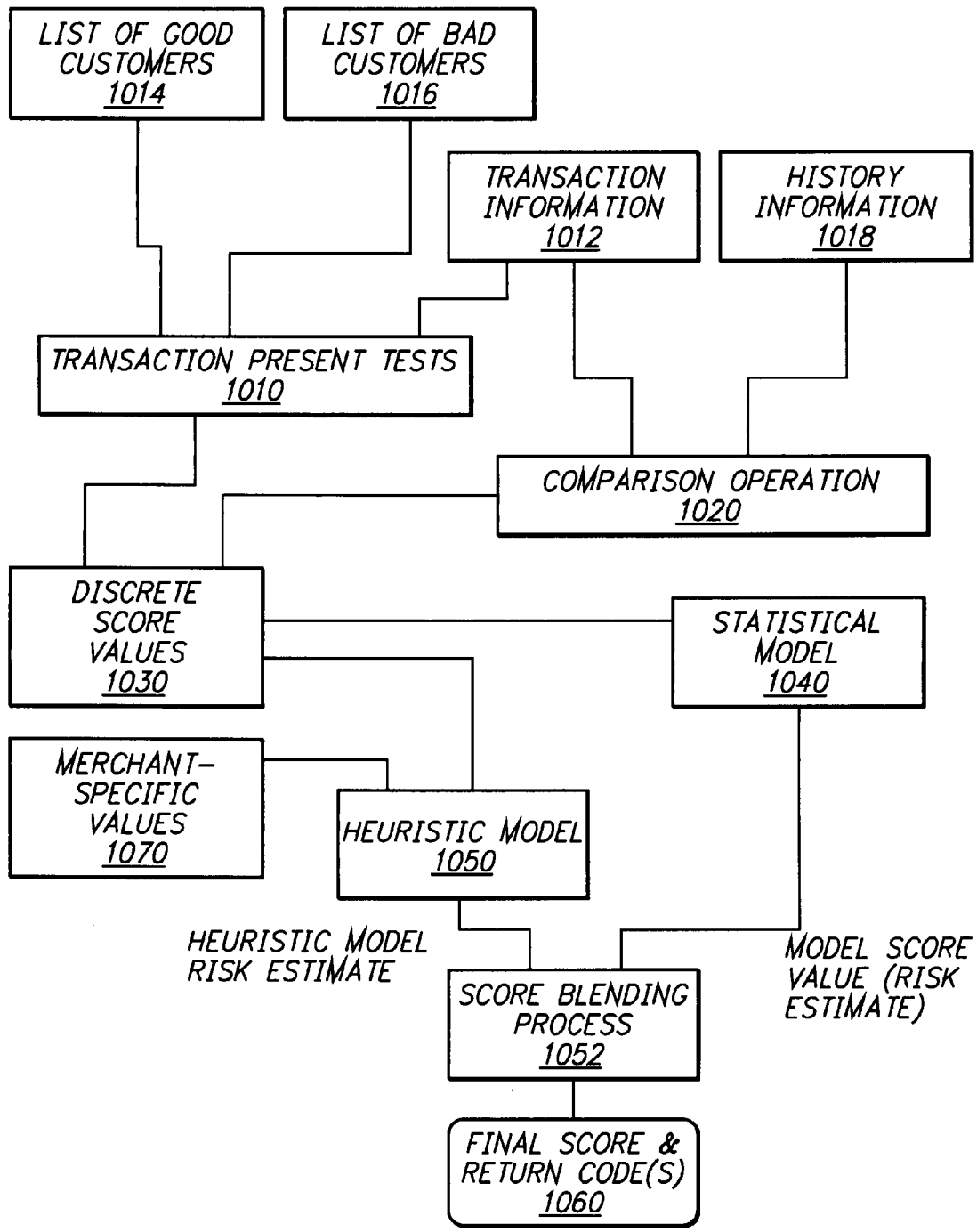
FIG. 10B is a block diagram illustrating a transaction verification system that may be used to implement fraud screening and risk scoring system.

FIG. 10B is a block diagram of a transaction verification system that may be used to implement fraud screening and risk scoring system 1007. Generally, the system of FIG. 10B can evaluate information representing one or more transactions to result in creating and storing a score value that represents a risk to a merchant associated with processing the transaction. Transaction information 1012, a list of good customers 1014, a list of bad customers 1016 and other pertinent information are received from a merchant who wishes to screen transactions using the system. Transaction information 1012 comprises specific information that describes a particular purchase transaction, such as customer name, shipping address, billing address, time, products ordered, price or amount of order, method of payment, card number and expiration date for credit card payments, etc. The transaction information 1012 also may include Internet-specific information such as customer domain, email address, IP address, etc.

Transaction history information 1018 also is received from the merchant or maintained by the system. History information 1018 comprises information about past transactions for the same merchant and customer that the system has processed. Specific values in history information 1018 include the same values described above with respect to transaction information 1012. Thus, history information 1018 may comprise a database of records of past transactions. The history information 1018 is maintained in a database at the service provider that is processing the transactions.

The list of good customers 1014 and list of bad customers 1016 comprise one or more tables or lists of information identifying past customers of the merchant with which the merchant has successfully collected funds for a transaction ("good customers") or experienced non-payment from a disputed transaction, fraud, etc. ("bad customers"). Alternatively, lists 1014 and 1016 may comprise order information that is marked as good or bad by the merchant, and in practice, such lists are treated as good or bad markings of customers themselves or their Internet identities.

The transaction information 1012 is first subjected to transaction present tests 1010. The transaction present tests 1010 comprise a plurality of computer-implemented filters, tests, computations and other operations that determine whether transaction information 1012 genuinely represents a good transaction. For example, transaction present tests 1010 determine whether transaction information 1012 is expressed in proper form, etc., to arrive at a value representing the relative risk that the customer is attempting to pass a fraudulent order through the system.

If the transaction information 1012 passes transaction present tests 1010, then in comparison operation 1020, transaction information 1012 is compared to history information 1018 to result in creating and storing one or more discrete score values 1030. Each of the discrete score values 1030 represent a relative risk evaluation carried out individually by transaction present tests 1010 and comparison operation 1020.

The discrete score values 1030 are then applied to a statistical model 1040, resulting in creating and storing at least one or more model score values. Statistical model 1040 comprises one or more weighted computations or other computer-implemented mathematical operations that apply statistical formulae and weight values to the discrete scores. The purpose of statistical model 1040 is to apply statistical analysis, based on the history information 1018 and other records of what transactions have been found in practice to be actually fraudulent, to the discrete score values 1030. The discrete score values 1030 are also applied, in parallel, to a heuristic model 1050 to generate a heuristic model risk estimate.

The resulting model score value from statistical model 1040 and heuristic model risk estimate from heuristic model 1050 are blended using score blending process 1052 to produce an overall final risk estimate. Thus, score blending process 1052 provides a way to combine the heuristic model score with the model score value created as output by statistical model 1040.

Optionally, heuristic model 1050 may also take into account one or more merchant-specific values 1070. Merchant-specific values 1070 may comprise, for example:

1. Product category information, such as a value that limits the maximum number of products in a particular category that a customer is permitted to purchase online in one transaction. Product categories may be specified by the transaction processing system, or specified by the merchant;
2. Selling frequency information, i.e., how often a customer is permitted to buy a particular product over a specified period of time, e.g., a subscription product that can be purchased only once a week;
3. One or more time of day weight values that indicate how important the buyer's time of purchase is, or that indicate what range of time in a day represents a reasonable time at which a buyer is expected to buy a particular product;
4. A "risky host" weight value that reflects an amount of risk associated with a particular host from which a customer order originates, as indicated by the customer's originating IP address or customer's claimed e-mail domain;
5. A gender bias value that indicates whether a specified product is strongly expected to be associated with a purchaser of a particular gender, so that risk increases if the system determines that the purchaser is probably of the other gender;
6. A value indicating the relative weight placed by the merchant on a difference in billing address and shipping address of the customer;
7. A first "velocity" value indicating how often the buyer has made online purchases at all;
8. A second "velocity" value indicating how often the buyer has made online purchases of a specified product category from a specified merchant.

As a result of blending the heuristic model and statistical model scores, a final score value and one or more return code values are created and stored, as indicated by block 1060. In one embodiment, the final score value is in the range of 0-100, where "0" represents a transaction that is extremely unlikely to involve fraud and "100" involves a transaction that is highly likely to represent fraud. The return code values signify special results or other functions.

In one embodiment, one of the return codes comprises one or more bytes of score flags that signal a recommendation to the merchant to reject the transaction regardless of any other criteria of the merchant. For example, score flags may indicate that one of the merchant "velocity" criteria exists in the order, or that prior orders related to the individual who placed the current order are on a fraud list. Alternatively, a score flag may indicate that a customer placing the current order is found in list of bad customers 1016. If prior orders of the customer are on the fraud list, then the current transaction is automatically added to the fraud list as well.

The final score value and return code values are returned to the merchant in one or more messages, using an appropriate protocol. In one particular embodiment, the system of FIG. 10B creates a message that conforms to SCMP, packages the final score value and return code values in the SCMP message, and sends the SCMP message over a secure channel to the merchant.

Transaction Present Tests

In one embodiment, transaction present tests 1010 comprise a plurality of tests selected from among the following:

1. A "Gibberish city" test detects whether the customer city name value has no vowels, is too short, or has three of the same letter in a row.
2. A "Gibberish last name" test detects whether the customer last name value has no vowels, is too short, or has three of the same letter in a row.
3. A "Gibberish first name" test detects whether the customer first name value received from the merchant has no vowels or has three of the same letter in a row.
4. A "Bad word in email" test detects whether the email address value received from the merchant contains a suspicious string.
5. A "Bad word in first name" test detects whether the first name value received from the merchant contains a string marked as high-risk.
6. A "Bad word in last name" test detects whether the last name value received from the merchant contains a string marked as high-risk.
7. A "Bad word in city" test detects whether the city value received from the merchant contains a string marked as high-risk.
8. A "State change(s) found" test detects whether historical orders related to the current request have different state values associated with them.
9. A "High number of credit cards" test detects whether historical orders related to the current request have many different credit card numbers associated with them.
10. A "Long term penalty" test detects whether the customer is attempting to make too many purchases of a product during the long-term hedge period specified by the merchant for the current order.
11. A "Fraud list" test detects whether information identifying the customer is found in an external fraud list.
12. A "Name Change(s) Found" test detects whether historical orders related to the current request have different customer last name values associated with them.
13. An "Email/name match" test detects whether the first name value or last name value provided by the customer also appears in the email address value provided by the customer.
14. A "Browser type penalty" test detects whether the customer is using a Web browser program that is marked as high-risk.
15. A "Browser email/email mismatch" test detects whether the email address that is stored as a configuration variable by the customer's Web browser program does not match the email address that the customer provided in the order information.
16. A "No electronic products" test detects whether the order contains no electronic or digital products, as opposed to tangible products.

17. A "Phone number bad length" test detects whether the telephone number value that the customer provided has the wrong number of digits.
18. An "Invalid phone number" test detects whether the telephone number value provided by the customer is invalid. For example, in the United States telephone numbers having the prefix "555" or "111" are invalid.
19. A "Suspicious area code" test detects whether the telephone number value provided by the customer includes a high-risk area code value.
20. An "Area code/state mismatch" test detects whether the area code within the telephone number value is associated with a state other than the state value provided by the customer.
21. An "Area code nonexistent" test detects whether the telephone area code value provided by the customer is not a valid area code or does not exist.
22. A "Toll-free phone number" test detects whether the telephone number value provided by the customer is a toll-free telephone number.
23. A "U.S. address with foreign domain" test detects whether the top-level domain portion of the email address value provided by the customer is associated with a foreign country but the shipping address or billing address value provided by the customer is a U.S. address.
24. A "Bill/ship state mismatch" test detects whether the shipping state value provided for an order does not match the state value in the billing address of the credit card information provided with the order.
25. A "Bill/ship country mismatch" test detects whether the shipping country value provided for an order does not match the country value in the billing address of the credit card information provided with the order.
26. An "AVS" test determines whether a score value associated with the order should be adjusted based on the results of testing the order information using an address verification system.
27. A "BIN penalty" test determines whether a penalty value should apply because the Bank Identification Number ("BIN") received from the customer, which forms the first four to six digits of a conventional credit card number, is marked as high-risk.
28. A "Digits/all lower-case in name" test determines whether the customer name value is all in lower case, or contains numeric digit characters.
29. A "Sequential digits in phone number" test determines whether the customer telephone number value contains multiple consecutive sequential digits.
30. A "Goodguy" test determines whether matching customer information is found in list of good customers 104.
31. An "Unable to verify address" determines whether the customer address is unverifiable; international and military addresses may cause such a result.
32. A "City/state/zip mismatch" test determines whether the city, state, and ZIP code values provided by the customer are not associated with one another based on data available from the Postal Service.
33. An "IP address/hostname mismatch" test determines whether the resolved IP address associated with the customer does not match the hostname portion of the email address provided by the customer.
34. A "No hostname" test determines whether the customer IP address value received as part of the transaction information does not resolve, using the DNS system of the Internet, into a valid hostname value.
35. An "Email in originating domain" test detects whether the email address value provided by the customer is in the same domain as the customer's resolved domain name.
36. An "AOL user from non-AOL host" value detects whether the customer email address value purports that the customer is an America Online user, but the customer is communicating with the merchant from a host other than an AOL host.
37. An "ISP state mismatch" test detects whether a state value that is provided by an Internet Service Provider as part of a resolved domain name does not match the state value provided by the customer. For example, Microsoft Network provides customer state information as part of a resolved domain name, e.g., "chicago-il.us.msn.com," that can be checked against the state value provided by the customer in the transaction information.
38. A "Netcom oldstyle host" test detects whether the customer is using a shell account of the Internet service provider Netcom that can be used to hide the true identity of the customer.
39. A "Bill country/email mismatch" test detects whether the country value provided by the customer in its billing address information does not match the country value of the customer's email address.
40. A "Bill country/IP host mismatch" test detects whether the country value provided by the customer in its billing address information does not match the country in which the host indicated by the customer's IP address is located, based on resolution using the DNS system.
41. An "Email/IP host country mismatch" test detects whether the country value in the customer's email address does not match the resolved domain name country.
42. A "Where is check negative" test detects whether the country associated with the customer's IP address, according to the "whereis" database of Network Solutions, Inc., does not match the country value of the customer's address information.
43. A "Time Risk" test determines the riskiness of the transaction time of day.
44. A "Host Risk" test determines the riskiness of the Internet source location from which the transaction originates, based on either email address or Internet domain ip_address.
45. A "Gender Mismatch Risk" test determines whether the customer gender violates normative expectations in relation to the specified product.
46. Several "Velocity" tests determine the riskiness of the buyer's behavior over time. One of these tests is more general, analyzing the buyer's overall e-commerce activity patterns. The other is more specific, analyzing the buyer's behavior at a specific merchant site with regard to specific categories of goods.
47. A "Gift" test determines whether a mismatch between the billing and shipping addresses is risky or not.

Other tests not specifically identified above may be used.

Gibberish Tests

Figure 11:
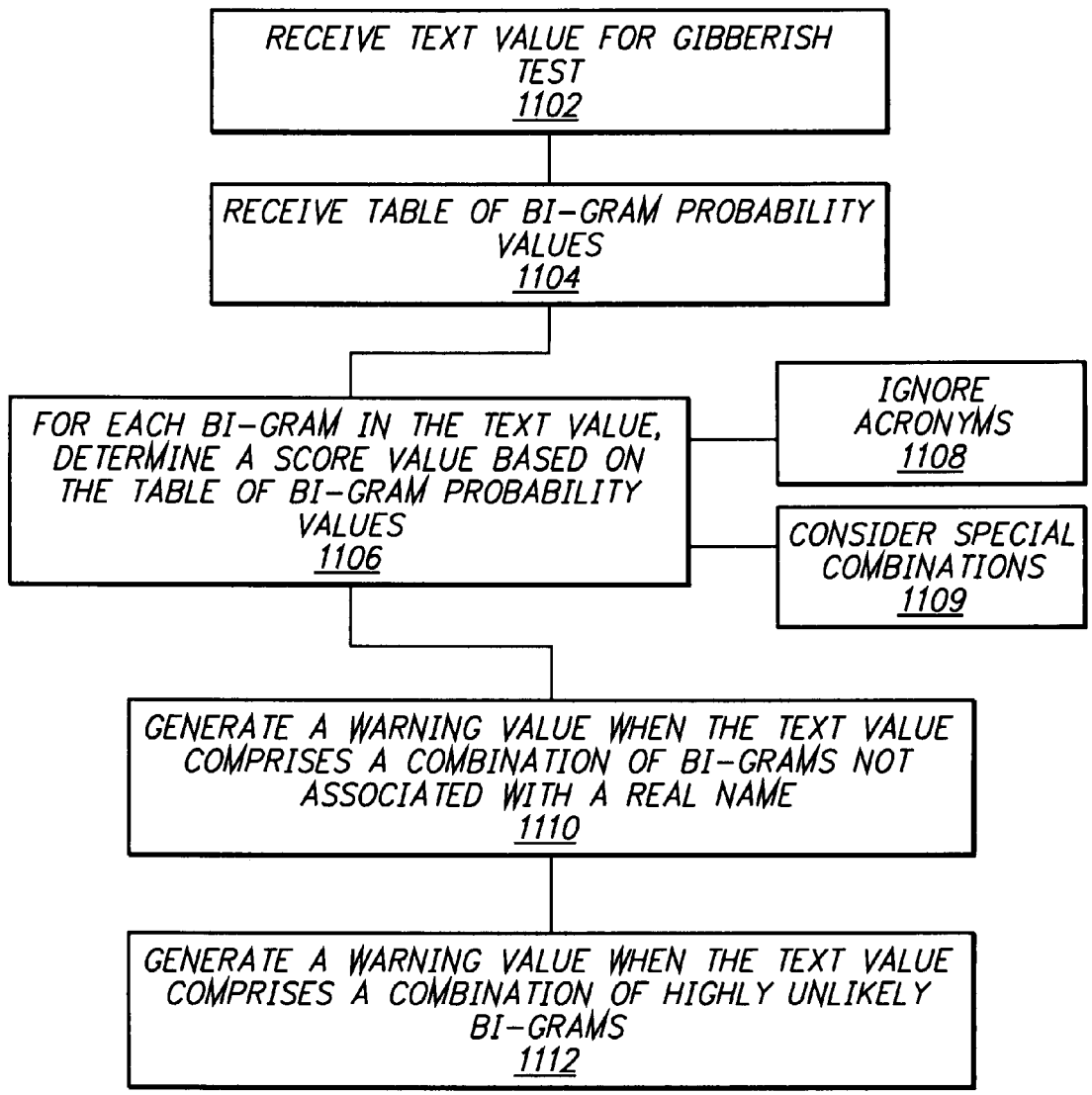
FIG. 11 is a block diagram illustrating an example embodiment of a gibberish test.

Transaction present tests 1010 may include one or more tests to determine whether one or more values of transaction information 102 consist of unintelligible or meaningless text ("gibberish"). FIG. 11 is a block diagram of an example embodiment of a gibberish test.

In block 1102, a text value for gibberish testing is received. For example, gibberish testing may be applied to a customer first name value or a last name value received from a merchant for a particular customer.

In block 1104, a table of bi-gram probability values is received. In one embodiment, the table of bi-gram probability values consists of rows representing letter pairs ("bi-grams") and columns representing the likelihood that a specified bi-gram will appear (a) as the first pair of letters in of a text string, (b) anywhere in the middle of the text string, or (c) as the last pair of letters in a text string, where one column of the table is associated with situation (a), (b), and (c).

An example of a bi-gram is "DA." For this bi-gram, the table could have a value of "80" in the first column position, indicating that the letter pair "DA" is likely to appear in the first ordinal position of a true name, as in "DAVID" or "DANIEL." For the same bi-gram, the table could have a value of "20" in the second column position, indicating that a true name is unlikely to have the letter pair "DA" in the middle of the name. Other numeric values may be used. In one specific embodiment, the table of bi-gram probability values is created and stored manually or automatically based on name information received from a trusted source. For example, name information from U.S. census data may be used.

In block 1106, for each bi-gram in the text value that is received in block 1102, a score value is determined based on the table of bi-gram probability values. In one embodiment, block 1106 involves scanning through each bi-gram in the received text value, and looking up each such bi-gram in the table. For each bi-gram, a score value is generated based on the corresponding probability value that is found in the table. If a bi-gram is not found in the table, a default value may be ascribed, typically representing a low probability.

As indicated in block 1108, the score value determination in block 1106 preferably ignores or screens out received text values that comprise acronyms. In one embodiment, acronyms are recognized in that a first received text value (e.g., first name) consists of all capital letters and a second received text value (e.g., last name) is mixed case. If an acronym is detected, then the score value determined in block 1106 may be modified or set to a default value.

Special letter combinations may be considered, as indicated in block 1109. For example, in one embodiment, the process of block 1106 attempts to determine an ethnicity associated with the received text values, and if such a determination is made, the values obtained from the table may be adjusted. For example, in a large random sample of names, appearance of the bi-gram "SZ" in the first ordinal position of a last name value may be unlikely. However, that combination is common surnames of Eastern European origin. Accordingly, if the process can determine that a received first name value appears to be a Eastern European name, then certain other letter pairs are more likely to appear in the received text. For example, the letter pair "CZ" may be more likely. Therefore, in response, the probability value received from the table for such letter pairs may be adjusted.

Separate tables may be created and stored for first name values and last name values. Thus, block 1104, block 1106, block 1108, and block 1109 may involve separate iterations for a first name value and last name value.

Based on the score values determined in block 1106, the process creates or generates one or more error values or warning values. In one embodiment, block 1106 may involve a screening process whereby a score value representing an error is generated only when a bi-gram in the received text value is not found anywhere in the probability table. This option may be used to reduce processing time or when only a rough check of a text value is needed.

As an alternative, in block 1110, a warning value is generated when the received text value comprises a combination of bi-grams that are determined to be unlikely to be associated with a real first name or last name.

As yet another alternative, as indicated by block 1112, a warning value is generated only when the received text value comprises a combination of highly unlikely bi-gram values. In this alternative, the warning value is selected to indicate that the received text value is suspicious, but not so unusual as to warrant rejection of a transaction by the merchant.

The table of bi-gram probability values may be updated as additional information becomes available, e.g., at each census interval. Separate tables may be prepared for name values of foreign origin, e.g., Japanese names in kana representation.

Geo-Location Tests

Figure 12A:
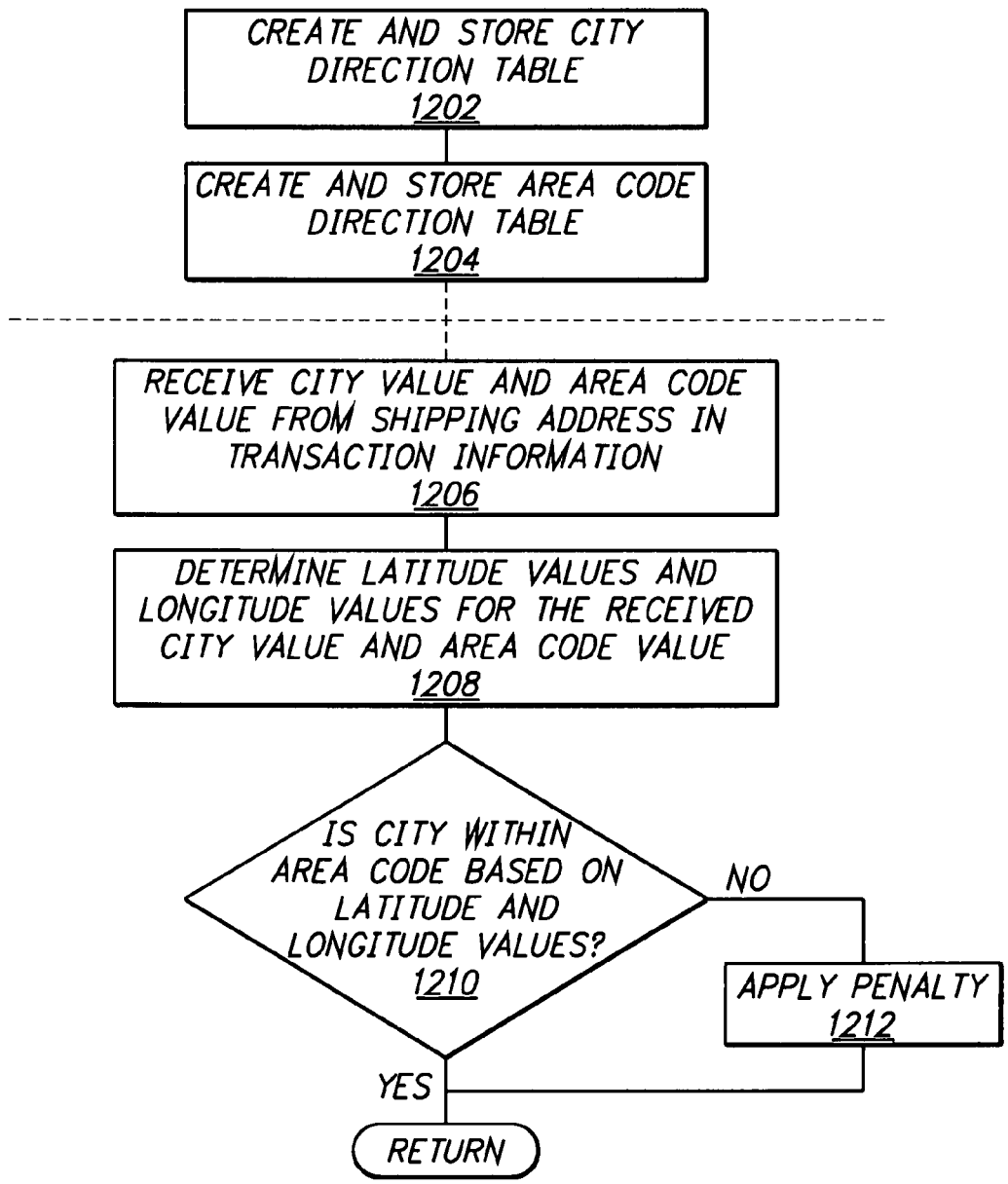
FIG. 12A is a flow diagram illustrating a process of applying a geo-location test based on area code.

FIG. 12A is a flow diagram of a process of applying a geo-location test based on area code. The geo-location test of FIG. 12A uses information in two tables. In block 1202, a city direction table is created and stored. The city direction table has rows that correspond to city values in a customer shipping address. Columns of the table store the city name, a longitude value indicating the absolute longitude of the city, and a latitude value indicating the absolute latitude of the city. In block 1204, an area code direction table is created and stored. The area code direction table has rows that correspond to all possible or known area code values. Columns of the table store one or more longitude values and latitude values that represent the bounds of the area contained within the area code. Alternatively, the area code direction table comprises area code values stored in association with vectors that indicate the boundaries of the area code in terms of latitude and longitude.

Using the values in the tables, information provided by a prospective customer may be tested. In one approach, the city value received from the customer is tested to determine whether it is within the area code value provided by the customer. For example, the position of the center of the city indicated in the city value provided by the customer is determined and then correlated to the values in the area code direction table. Stated another way, the test determines whether the area code specified by the customer actually contains the city specified in the shipping address.

In block 1206, a city value and an area code value are received from the shipping address information in the transaction information for an order or customer. As indicated by the dashed lines separating block 1204 and block 1206, the action in block 1206 may occur at a separate time interval from the action of block 1202 and block 1204. The separate time interval may be any duration. Thus block 1202 and block 1204 may be viewed as preparatory steps that may be carried out in an offline mode or at a separate time.

In block 1208, latitude values and longitude values associated with the received city value and the received area code are determined. In one embodiment, a first latitude value and a first longitude value are obtained by looking up the city value in the city direction table, and a second latitude value and a second longitude value are obtained by looking up the received area code value in the area code direction table.

In block 1210, based on the latitude and longitude values, the system tests whether the received city value is within the received area code value. If not, then a penalty value is applied to the transaction, as indicated by block 1212. If the city is properly found within the limits of the specified area code, then no penalty is applied and control continues with other tests or order processing.

Figure 12B:
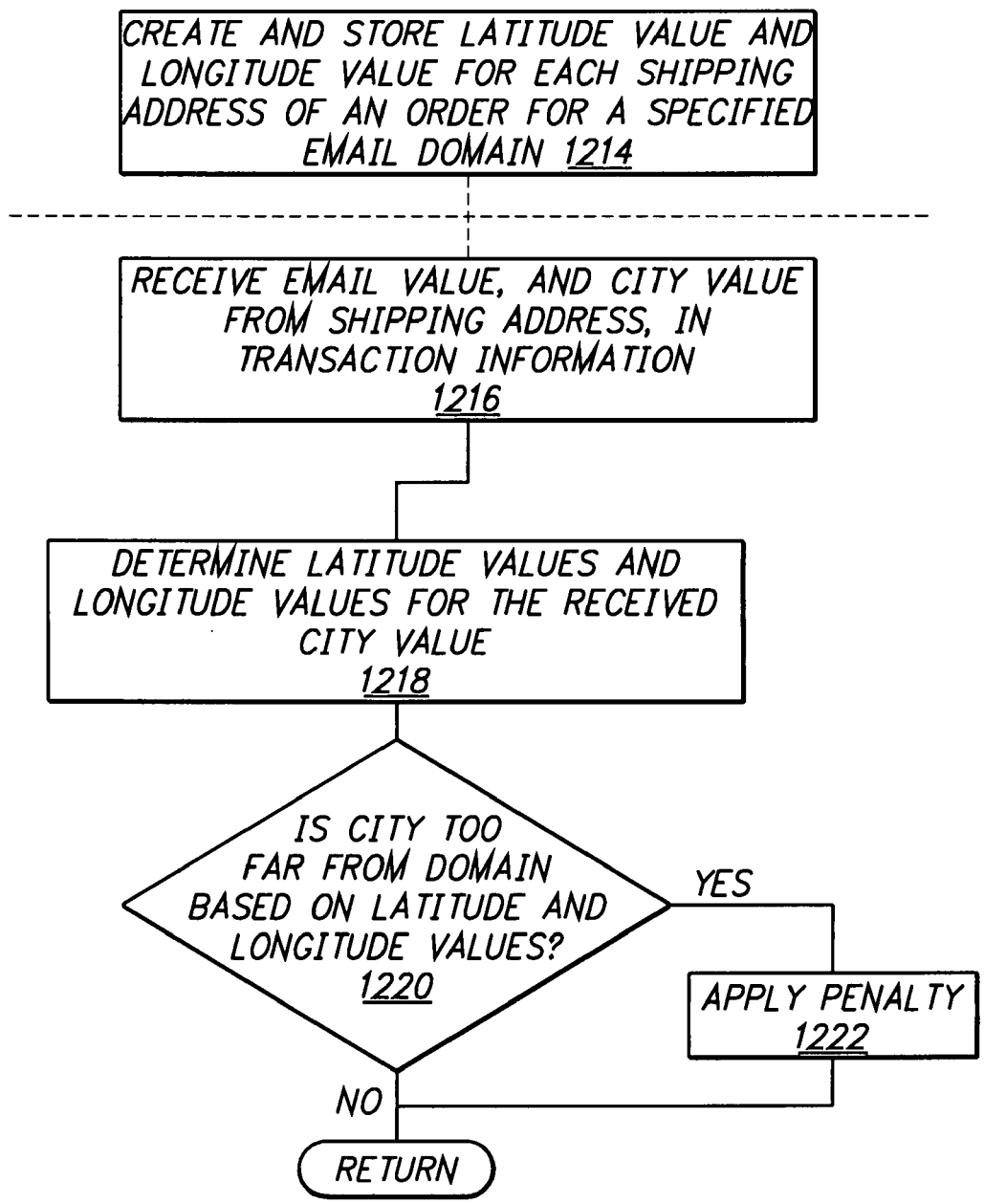
FIG. 12B is a flow diagram illustrating a process of applying a geo-location test based on email address.

FIG. 12B is a flow diagram of a process of applying another geo-location test based on email address. In the test of FIG. 12B, latitude and longitude values are created and stored for each shipping address for all orders from a specified email domain. If a plurality of past orders are concentrated around a particular range of latitude values and longitude values, and a subsequent order is received that provides a shipping address that is outside the range of the latitude values or longitude values, then the subsequent order is reported or tagged as high-risk.

A database table may store the latitude values, longitude values, and information identifying a historical order or a prior customer. In block 1214, a latitude value and a longitude value is created and stored for each shipping address of an order that is processed by a transaction processing system, in association with information identifying a specified email domain. Thus, assume that transaction information is received that includes an email address of the customer in the form "john_custname@isp.com," and a shipping address for customer John Custname. Based on the city value in the shipping address, the system computes or otherwise determines (e.g., by a lookup in the city direction table that is created as part of FIG. 12A) a latitude value and longitude value for the city value. A record containing the domain value "isp.com," the latitude value, and the longitude value is created and stored in the database. The process of block 1214 is carried out each time a transaction is processed in the system.

In block 1216, an email address of a prospective customer, and a city value from the shipping address portion of transaction information, are received for a new order. Thus, block 1216 can occur concurrently with block 1214 or at some later time. In block 1218, a latitude value and a longitude value are determined for the received city value.

In block 1220, the process tests whether the received city value is too far from the domain indicated in the received email address value. For example, the process can determine whether the latitude value and longitude value for the received city value, as computed in block 1218, differ too much from a metric that represents corresponding values in the database, e.g., a standard deviation value for the latitude value and longitude value. Alternative mechanisms may be used for determining that the received city value is too far from the geographical area indicated by all other city values for other transactions that reference the same email domain.

If the test of block 1220 is true, then as indicated in block 1222, a penalty is applied to the transaction. Otherwise, control continues with other tests or processing.

This test is effective when a particular Internet Service Provider (ISP) serves a geographically focused customer base. In that case, if an order arrives that includes a shipping address that is far outside the ISP's traditional geographical service area, then the system may hypothesize that the customer is using stolen identity information or stolen credit card information. Such a test may be supplemented with human review of score values in order to ensure that the rate of false negative results ("insults") is not too high.

Figure 12C:
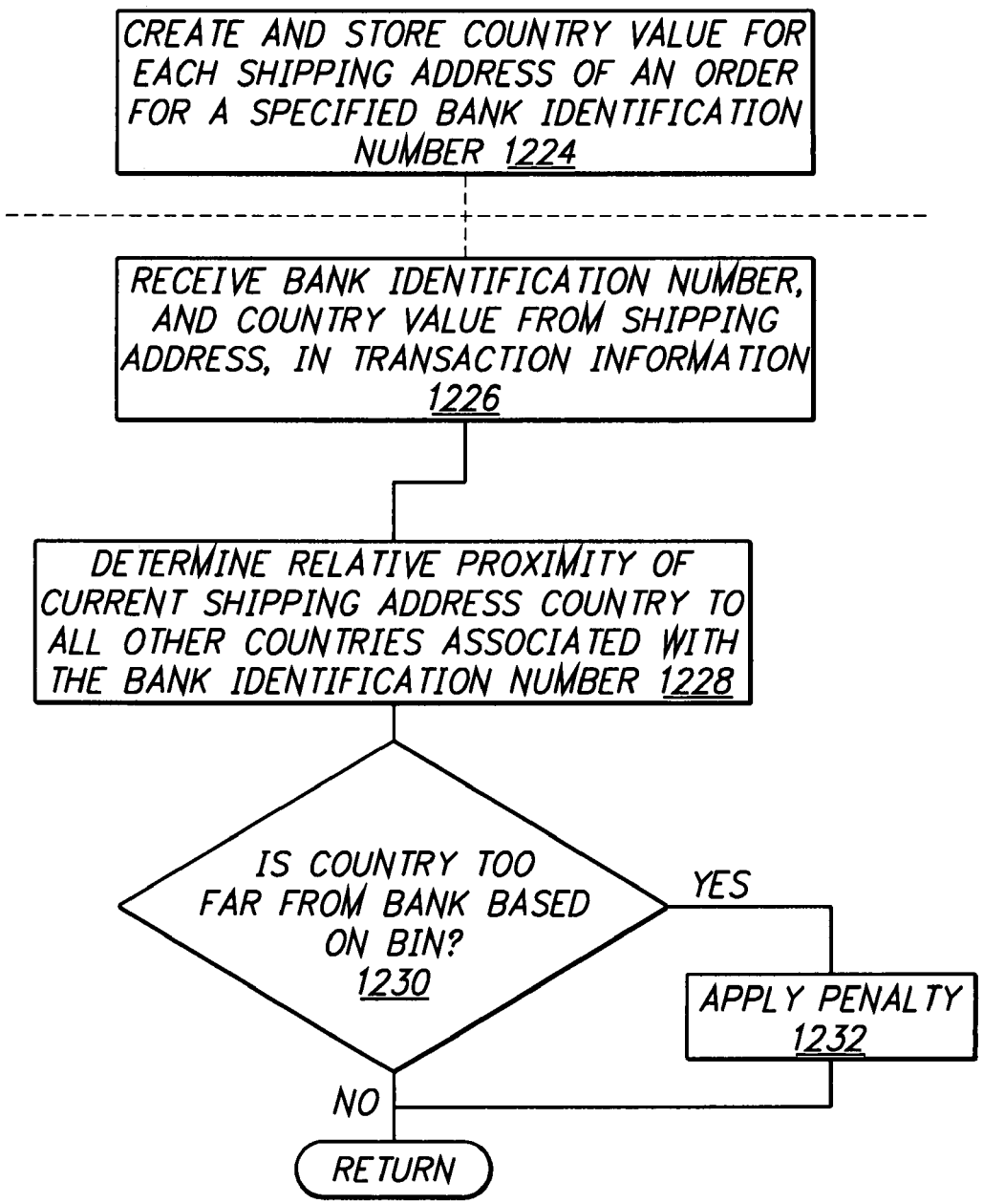
FIG. 12C is a flow diagram illustrates a process of applying a geo-location test based upon bank identification number.

FIG. 12C is a flow diagram of a geo-location test based upon bank identification number. In FIG. 12C, the BIN value of the credit card number provided by a prospective customer is used in geographic consistency screening. In block 1224, the country value of the shipping address in each order processed by the system is stored in association with the BIN value of the credit card number that is specified in the order. Thus, block 1224 involves building a table that associates BIN numbers with the shipping address location of actual orders. Alternatively, in BIN value geo-consistency screening, a range of latitude and longitude values are stored in a database in association with a BIN value.

In block 1226, a country value is received from the shipping address portion of transaction information for a new order. In block 1228, the relative proximity of the current shipping address country value is determined, relative to all other countries associated with the bank identification number that is specified in the order. Block 1228 may involve, for example, looking up a distance value or weight value in a country distance table that correlates every country of the world with every other country in the world. The distance value or weight value may reflect geographical distance, political distance, cultural distance, etc. For example, a value that correlates the United States to Canada might be very high, whereas a value that correlates the United States to Cuba might be very low because even though the United States is geographically close to Cuba, politically it is distant.

In block 1230, a comparison is made to determine whether the country represented by the country value of the current order is too far from the bank that is associated with the BIN value, as indicated by the country distance table. If so, as indicated in block 1232, a penalty is applied.

Thus, if a plurality of past orders that include a specified BIN value are concentrated around a particular range of countries, and a subsequent order is received that provides a shipping address that is outside the range of countries, then the subsequent order is reported or tagged as high-risk. This test is effective when a particular bank serves a geographically focused customer base. In that case, if an order arrives that includes a shipping address that is far outside the bank's traditional geographical service area, then the system may hypothesize that-the customer is using stolen identity information or stolen credit card information. For example, assume that a customer presents transaction information 1012 that identifies a credit card number that includes a BIN value associated with a bank headquartered in New York; however, the shipping address for the order includes a country value of "Bulgaria." This may indicate that the order is fraudulent. Such a test may be supplemented with human review of score values in order to ensure that the insult rate is not too high.

History Testing—Comparison Operation

In one embodiment, comparison operation 1020 (FIG. 10B) involves comparing transaction information 1012 (FIG. 10B) to history information 1018 (FIG. 10B) to result in creating and storing one or more discrete score values 1030 (FIG. 10B). Such history testing generally involves verifying that the current transaction information 1012 is consistent with all previous transactions associated with an individual.

In one embodiment, transactions are associated with an Internet identity. In this context, an "Internet identity" comprises a unique identifier of a purchaser or other individual who submits order transactions. An Internet identity may comprise an email address. Such an Internet identity value tends to facilitate better screening results in cases where an individual uses a plurality of different email addresses to place orders.

Figure 13:
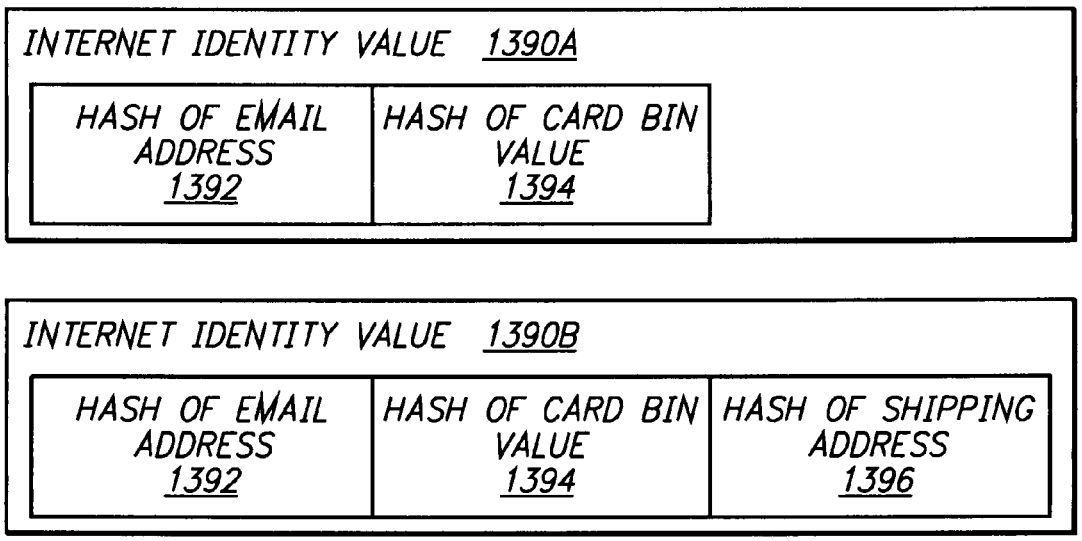
FIG. 13 is a block diagram illustrating alternative embodiments of an Internet identity value system.

FIG. 13 is a block diagram of alternative embodiments of an Internet identity value. A first embodiment of an Internet identity value 1390A consists of the combination of a hash value based on an email address, as indicated by block 1392, and a hash value based on a credit card BIN value, as indicated by block 1394. Using a value that includes a credit card number as a base element tends to improve accuracy for individuals who use multiple credit cards for different users. In this embodiment, each Internet identity value uniquely identifies a particular email address and card combination.

In any of the foregoing embodiments, in place of a credit card number, the system may use a value that uniquely identifies a purchase method other than a credit card. For example, if a customer uses an electronic check or a stored value card to make a purchase, a check number or card identifier may be used to create the Internet identity value.

Other combinations of values may be used. Referring again to FIG. 13, a second embodiment of an Internet identity value 1390B consists of the combination of a hash value based on an email address, as indicated by block 1392, and a hash value based on a credit card BIN value, as indicated by block 1394, and a hash value based on a shipping address, as indicated by block 1396. This alternative improves accuracy where a plurality of orders use different email addresses and credit card numbers but are all shipped to the same address, especially in the case of residential deliveries.

Still other values could be used. For example, an Internet identity may comprise a first hash value of an prospective purchaser's host IP address, in combination with a second hash value of an email address of a prospective purchaser carried, in combination with a third hash value of a card bank identification number of the prospective purchaser and a fourth hash value based on a shipping address of the prospective purchaser. As another alternative, an Internet identity may comprise a first hash value of a prospective purchaser's hardware device ID value, in combination with a second hash value of either the email address or user ID of the prospective purchaser, in combination with a third hash value of a card bank identification number of the prospective purchaser and with a fourth hash value based on a shipping address of the prospective purchaser. What is important is to use a value that accurately represents the repeating identity of a particular Internet user across multiple orders, regardless of the host or terminal that the Internet user uses to connect to the network.

Historic transactions in history information 1018 (FIG. 10B) that are associated with the Internet identity of the current transaction may be obtained, for example, by issuing a database query to a database that contains the historical transaction information, and receiving a set of records in response as history information 1018. As records are retrieved, comparison operation 1020 (FIG. 10B) looks for information that signals that the comparison operation should stop. In one embodiment, if any of the records that are returned from the database is for a prior order is on the fraud list, then the system skips comparison operation 1020. This mechanism ensures that unnecessary processing is skipped for orders that are associated with past fraudulent orders, because if such orders are processed using comparison operation 1020, they are certain to end in a negative result. Alternatively, history processing ceases if more than 500 history records are retrieved, and comparison operation 1020 is carried out using only the 500 records that are retrieved. As a result, query time and overall transaction-processing time is reduced. In addition, Internet identity values that are associated with test identities that are created by merchants to verify system operation are screened out.

In one embodiment, one of the return codes comprises one or more bytes of score flags that signal a recommendation to the merchant to reject the transaction regardless of any other criteria of the merchant. For example, score flags may indicate that one of the merchant "velocity" criteria exists in the order, or that prior orders related to the Internet identity that placed the current order are on a fraud list. Alternatively, a score flag may indicate that a customer placing the current order is found in list of bad customers 1016 (FIG. 10B). If prior orders of the customer are on the fraud list, then the current transaction is automatically added to the fraud list as well.

History information 1018 (FIG. 10B) may be created and stored by a screening system of the type shown in FIG. 10A as it processes transactions. In one embodiment, the system creates and stores one or more score logs. Each record of a score log identifies a transaction and contains one or more penalty values that resulted from application of the transaction present tests 1010 (FIG. 10B) and other tests of the system to the transaction information 1012 (FIG. 10B). Thus, manual or automated review of the score logs may reveal how a particular transaction was processed in the system.

Further, in one embodiment, the system includes a test scores table, and the system updates values in the test scores table as it processes transactions. The test scores table contains, for each order, a result value or penalty value for each test that is conducted for an order. In a specific embodiment, the test scores table comprises columns for order number, email address, credit card number, and columns for each test that is carried out as part of transaction present tests 1010 (FIG. 10B). The test scores table may also include the model score value that is provided as output from statistical model 1040 (FIG. 10B), and the final score value and return codes that are provided at block 1060 (FIG. 10B).

Accordingly, using data in the test scores table, statistical evaluations of the test results may be created. Further, database queries may be applied to the test scores table in order to retrieve orders that are related in some manner. In the past approach, such processing required test parsing of the score logs. In the present approach, such parsing is eliminated, and improved views of the actual significance of tests are provided. As a result, the insult rate of a particular test may be rapidly and regularly evaluated.

Further, if transaction processing results in a high fraud score and the merchant rejects the order in response thereto, triggering a customer inquiry, then the merchant's customer service center can issue a query for the return codes and rapidly determine the exact reason for the high fraud score. The ability to obtain the return codes in a rapid manner also provides the merchant with a weapon against "social engineering," a fraud technique in which a declined customer telephones the merchant and attempts fabricates one or more reasons why the order should be accepted, in an attempt to verbally circumvent the merchant's computer-based fraud screens by playing to the emotions of the merchant's customer service representative. Using the disclosed system, the customer service representative can rapidly query the fraud screening system and receive a detailed description of why the order was refused. Such description may be generated based on one or more of the return code values.

Hardware Overview

Figure 14:
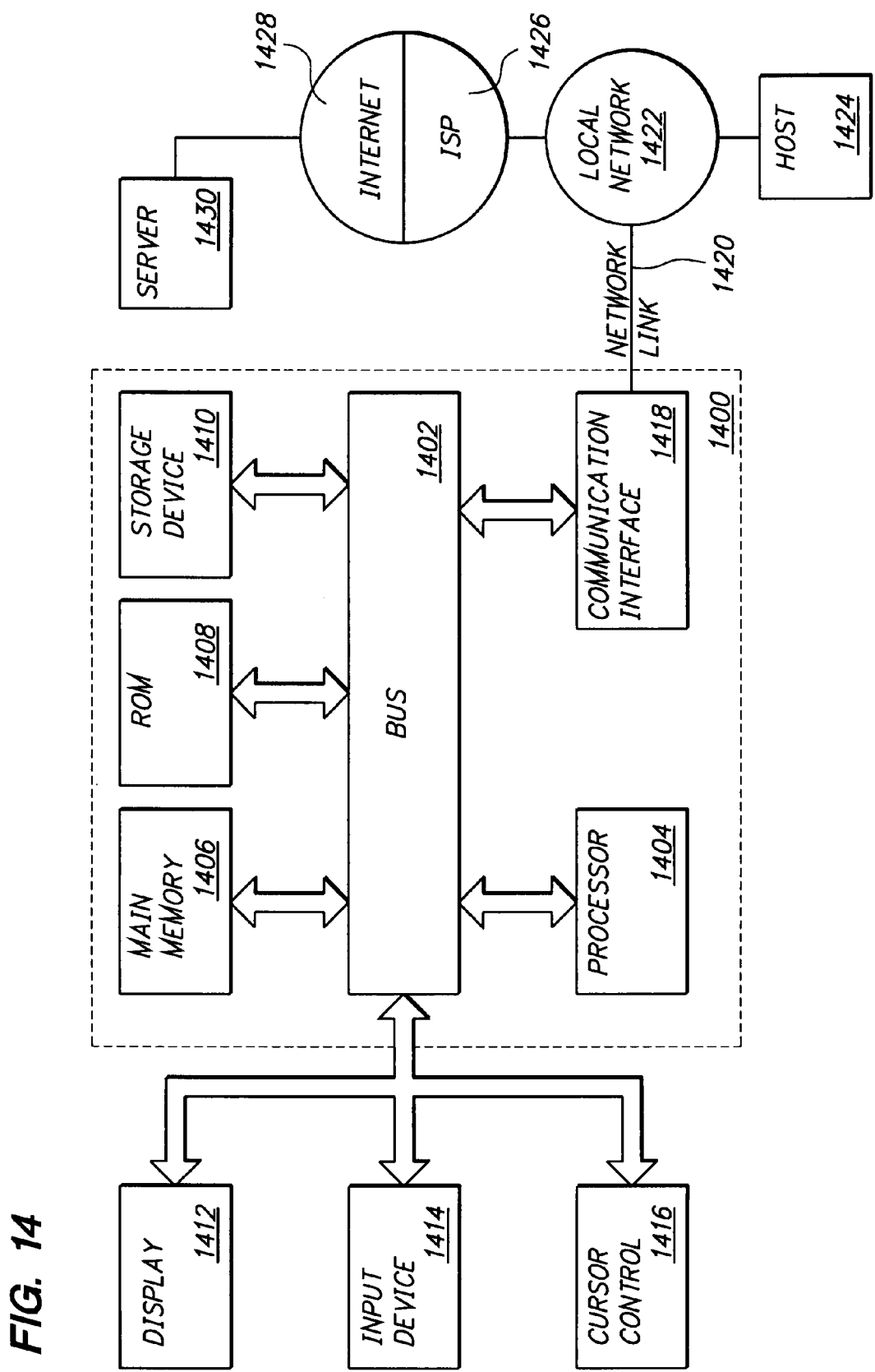
FIG. 14 is a block diagram illustrating a computer system upon which an embodiment of the invention may be implemented.

FIG. 14 is a block diagram that illustrates a computer system 1400 upon which an embodiment of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor

1404. Computer system 1400 further includes a read only memory (ROM) 1408 or other static storage device coupled to bus 1402 for storing static information and instructions for processor 1404. A storage device 1410, such as a magnetic disk, optical disk, or magneto-optical disk, is provided and coupled to bus 1402 for storing information and instructions.

Computer system 1400 may be coupled via bus 1402 to a display 1412, such as a cathode ray tube (CRT) or a liquid crystal display (LCD), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for implementing the techniques described herein. According to one embodiment of the invention, those techniques are performed by computer system 1400 in response to processor 1404 executing one or more sequences of one or more instructions contained in main memory 1406. Such instructions may be read into main memory 1406 from another computer-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1404 for execution. Such a medium may take many forms, including but not limited to, non-volatile media, volatile media, and transmission media. Non-volatile media includes, for example, optical, magnetic, or magneto-optical disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infrared signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In this manner, computer system 1400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for evaluating fraud risk in an electronic commerce transaction and providing a representation of the fraud risk to a merchant using electronic communication, the method comprising:
generating and storing two or more fraud risk mathematical models, each model having a corresponding distribution of fraudulent transactions and a corresponding distribution of non-fraudulent transactions;
generating for each mathematical model of the two or more mathematical models, a pair of corresponding sigmoidal functions, wherein one sigmoidal function of the pair of corresponding sigmoidal functions approximates a relationship between a set of raw scores produced by said each mathematical model and a percentage of fraudulent transactions associated with each raw score of the set of raw scores, and another sigmoidal function of the pair of corresponding sigmoidal functions approximates a relationship between said each raw score and a percentage of non-fraudulent transactions associated with said each raw score;
defining for each mathematical model a first point at which a number of transactions that represent mistaken sales begin to have a positive count; a second point at which a number of transactions that represent mistaken rejections begin to have a zero count; and a third point at which the fraudulent and non-fraudulent transaction distributions for said each mathematical model intersect, wherein the third point corresponds to a particular raw score for which a percentage of fraudulent transactions equals a percentage of non-fraudulent transactions;
receiving transaction information and performing:
applying the transaction information to the two or more fraud risk mathematical models, wherein each mathematical model produces a corresponding raw score; and
transforming the two or more corresponding raw scores into a single corresponding risk estimate using a first transform function when a raw score falls within a range of values between raw scores corresponding to the first point and the third point respectively, or a second transform function when the raw score falls within a range of values between raw scores corresponding to the third point and the second point respectively;
wherein the first transform function is different from the second transform function;
wherein the method is performed by a computer system.

2. The method claim 1 wherein two or more fraud risk mathematical models are applied to the transaction information to generate corresponding risk estimates, the method comprising the steps of:
combining two or more of the corresponding risk estimates, using fusion proportions that are associated with the two or more fraud risk mathematical models that generate the corresponding risk estimates, to produce a single point risk estimate for the transaction; and
transforming the single point risk estimate with a sigmoidal function to produce an optimized single point risk estimate for the transaction.

3. The method of claim 2 wherein each of the two or more corresponding risk estimates is based on a corresponding statistical mathematical model from a set of one or more statistical mathematical models or on a corresponding heuristic mathematical model from a set of one or more heuristic mathematical models, and wherein at least one corresponding risk estimate is based on a corresponding statistical mathematical model and at least one other corresponding risk estimate is based on a corresponding heuristic mathematical model, and wherein the step of combining two or more of the corresponding risk estimates comprises the steps of:
establishing either the corresponding statistical mathematical model or the corresponding heuristic mathematical model as a first scoring authority for establishing the boundaries of fraud risk zones from a set of fraud risk zones;
establishing the first scoring authority with authority to modify at least one corresponding risk estimate, from the two or more corresponding risk estimates, that is in a first particular fraud risk zone from the set of fraud risk zones, based on an intent of the first scoring authority with respect to transaction information;
establishing as a second scoring authority the other of the corresponding statistical and heuristic mathematical models that is not the first scoring authority; and
establishing the second scoring authority with authority to modify at least one corresponding risk estimate, from the two or more corresponding risk estimates, that is in a second particular fraud risk zone from the set of fraud risk zones that is different than the first particular fraud risk zone, based on an intent of the second scoring authority with respect to transaction information.

4. The method of claim 2 wherein the step of combining two or more of the corresponding risk estimates comprises the steps of:
analyzing performance characteristics of the two or more fraud risk mathematical models in view of distribution characteristics of a set of fraud risk zones, wherein the distribution characteristics are in terms of a relationship between fraudulent and non-fraudulent transactions and a percentage of transactions associated with a risk estimate; and
determining a corresponding contribution from each of the two or more fraud risk mathematical models to the single point risk estimate for the transaction, based on the analyzed performance characteristics of the two or more fraud risk mathematical models.

5. The method of claim 4 comprising the step of:
adjusting the corresponding contributions from the two or more fraud risk mathematical models based on a merchant preference for one fraud risk type in relation to another fraud risk type.

6. The method of claim 2 comprising the steps of:
determining intermediate fusion proportions that are associated with the corresponding risk estimates from a perspective of each of the two or more fraud risk mathematical models; and
reducing the intermediate fusion proportions to the fusion proportions that are associated with the two or more fraud risk mathematical models that generate the corresponding risk estimates, based on a non-linear classification algorithm.

7. The method of claim 1 wherein the two or more fraud risk mathematical models each include a plurality of risk tests, the method comprising:
computing a corresponding risk test penalty for at least some of the plurality of risk tests of the two or more fraud risk mathematical models, wherein the corresponding risk test penalty is equal to the inverse of the sum of one and a false positive ratio for a corresponding risk test and wherein the false positive ratio is a ratio of correct risk detections of fraudulent transactions to incorrect referrals of fraudulent transactions generated by the corresponding risk test; and computing a weighted summation of the risk test penalties to produce the corresponding raw score for the transaction.

8. The method of claim 1 wherein the step of generating the corresponding sigmoidal functions is performed by aligning inflection points of corresponding sigmoidal functions to the first, second, and third points.

9. The method of claim 1 wherein the step of generating the corresponding sigmoidal functions comprises the step of generating corresponding sigmoidal functions that are dynamically adjustable based on a change to the relationship.

10. A computer-readable volatile or non-volatile medium storing one or more sequences of instructions for evaluating fraud risk in an electronic commerce transaction and providing a representation of the fraud risk to a merchant using electronic communication, which instructions, when executed by one or more processors, cause the one or more processors to carry out the steps of:

generating and storing two or more fraud risk mathematical models, each model having a corresponding distribution of fraudulent transactions and a corresponding distribution of non-fraudulent transactions;

generating for each mathematical model of the two or more mathematical models, a pair of corresponding sigmoidal functions, wherein one sigmoidal function of the pair of corresponding sigmoidal functions approximates a relationship between a set of raw scores produced by said each mathematical model and a percentage of fraudulent transactions associated with each raw score of the set of raw scores, and another sigmoidal function of the pair of corresponding sigmoidal functions approximates a relationship between said each raw score and a percentage of non-fraudulent transactions associated with said each raw score;

defined by defining for each mathematical model a first point at which a number of transactions that represent mistaken sales begin to have a positive count; a second point at which a number of transactions that represent mistaken rejections begin to have a zero count; and a third point at which the fraudulent and non-fraudulent transaction distributions for said each mathematical model intersect, wherein the third point corresponds to a particular raw score for which a percentage of fraudulent transactions equals a percentage of non-fraudulent transactions;

receiving transaction information and performing:
   applying the transaction information to the two or more fraud risk mathematical models, wherein each mathematical model produces a corresponding raw score; and
   transforming the two or more corresponding raw scores into a single corresponding risk estimate using a first transform function when a raw score falls within a range of values between raw scores corresponding to the first point and the third point respectively, or a second transform function when the raw score falls within a range of values between raw scores corresponding to the third point and the second point respectively;
   wherein the first transform function is different from the second transform function.

11. The computer-readable volatile or non-volatile medium of claim 10 wherein two or more fraud risk mathematical models are applied to the transaction information to generate corresponding risk estimates, further comprising instructions which, when executed by the one or more processors, cause the one or more processors to carry out the steps of:
   combining two or more of the corresponding risk estimates, using fusion proportions that are associated with the corresponding risk estimates, to produce a single point risk estimate for the transaction; and
   transforming the single point risk estimate with a sigmoidal function to produce an optimized single point risk estimate for the transaction.

12. The computer-readable volatile or non-volatile medium of claim 11 wherein each of the two or more corresponding risk estimates is based on a corresponding statistical mathematical model from a set of one or more statistical mathematical models or on a corresponding heuristic mathematical model from a set of one or more heuristic mathematical models, and wherein at least one corresponding risk estimate is based on a corresponding statistical mathematical model and at least one other corresponding risk estimate is based on a corresponding heuristic mathematical model, and wherein the instructions for combining two or more of the corresponding risk estimates comprises instructions which, when executed by the one or more processors, cause the one or more processors to carry out the steps of:
   establishing either the corresponding statistical mathematical model or the corresponding heuristic mathematical model as a first scoring authority for establishing the boundaries of fraud risk zones from a set of fraud risk zones;
   establishing the first scoring authority with authority to modify at least one corresponding risk estimate, from the two or more corresponding risk estimates, that is in a first particular fraud risk zone from the set of fraud risk zones, based on an intent of the first scoring authority with respect to transaction information;
   establishing as a second scoring authority the other of the corresponding statistical and heuristic mathematical models that is not the first scoring authority; and
   establishing the second scoring authority with authority to modify at least one corresponding risk estimate, from the two or more corresponding risk estimates, that is in a second particular fraud risk zone from the set of fraud risk zones that is different than the first particular fraud risk zone, based on an intent of the second scoring authority with respect to transaction information.

13. The computer-readable volatile or non-volatile medium of claim 11 wherein the instructions for combining two or more of the corresponding risk estimates comprises instructions which, when executed by the one or more processors, cause the one or more processors to carry out the steps of:
   analyzing performance characteristics of the two or more fraud risk mathematical models in view of distribution characteristics of a set of fraud risk zones, wherein the distribution characteristics are in terms of a relationship between fraudulent and non-fraudulent transactions and a percentage of transactions associated with a risk estimate; and
   determining a corresponding contribution from each of the two or more fraud risk mathematical models to the single point risk estimate for the transaction, based on the analyzed performance characteristics of the two or more fraud risk mathematical models.

14. The computer-readable volatile or non-volatile medium of claim 13, further comprising instructions which, when executed by the one or more processors, cause the one or more processors to carry out the steps of:

adjusting the corresponding contributions from the two or more fraud risk mathematical models based on a merchant preference for one fraud risk type in relation to another fraud risk type.

15. The computer-readable volatile or non-volatile medium of claim 11 further comprising instructions which, when executed by the one or more processors, cause the one or more processors to carry out the steps of:
   determining intermediate fusion proportions that are associated with the corresponding risk estimates from a perspective of each of the two or more fraud risk mathematical models; and
   reducing the intermediate fusion proportions to the fusion proportions that are associated with the two or more fraud risk mathematical models that generate the corresponding risk estimates, based on a non-linear classification algorithm.

16. The computer-readable volatile or non-volatile medium of claim 10 wherein the two or more fraud risk mathematical models each include a plurality of risk tests, further comprising instructions which, when executed by the one or more processors, cause the one or more processors to carry out the steps of:
   computing a corresponding risk test penalty for at least some of the plurality of risk tests of the two or more fraud risk mathematical models, wherein the corresponding risk test penalty is equal to the inverse of the sum of one and a false positive ratio for a corresponding risk test and wherein the false positive ratio is a ratio of correct risk-detections of fraudulent transactions to incorrect referrals of fraudulent transactions generated by the respective risk test; and
   computing a weighted summation of the risk test penalties to produce the respective raw score for the transaction.

17. The computer-readable volatile or non-volatile medium of claim 10 wherein the instructions for generating the corresponding sigmoidal functions is performed by aligning inflection points of corresponding sigmoidal functions to the first, second, and third points.

18. The computer-readable volatile or non-volatile medium of claim 10 wherein the instructions for generating the corresponding sigmoidal functions comprises the step of generating corresponding sigmoidal functions that are dynamically adjustable based on a change to the relationship.

* * * * *

UNITED STATES PATENT AND TRADEMARK OFFICE
CERTIFICATE OF CORRECTION

PATENT NO. : 7,865,427 B2  Page 1 of 1
APPLICATION NO. : 10/142271
DATED : January 4, 2011
INVENTOR(S) : William Wright and Hung-Tzaw Hu It is certified that error appears in the above-identified patent and that said Letters Patent is hereby corrected as shown below:

Claim 10, col. 37, line 36, replace "defined by defining" with --defining--

Signed and Sealed this
First Day of March, 2011

David J. Kappos
*Director of the United States Patent and Trademark Office*